(12) United States Patent
Lopatin et al.

(10) Patent No.: US 8,546,020 B2
(45) Date of Patent: Oct. 1, 2013

(54) NUCLEATION AND GROWTH OF TIN PARTICLES INTO THREE DIMENSIONAL COMPOSITE ACTIVE ANODE FOR LITHIUM HIGH CAPACITY ENERGY STORAGE DEVICE

(75) Inventors: Sergey D. Lopatin, Morgan Hill, CA (US); Dmitri A. Brevnov, Santa Clara, CA (US); Connie P. Wang, Mountain View, CA (US); Robert Z. Bachrach, Burlingame, CA (US)

(73) Assignee: Applied Materials, Inc., Santa Clara, CA (US)

( * ) Notice: Subject to any disclaimer, the term of this patent is extended or adjusted under 35 U.S.C. 154(b) by 395 days.

(21) Appl. No.: 12/909,436

(22) Filed: Oct. 21, 2010

(65) Prior Publication Data

US 2011/0097628 A1    Apr. 28, 2011

Related U.S. Application Data

(60) Provisional application No. 61/254,365, filed on Oct. 23, 2009.

(51) Int. Cl.
*H01M 4/76* (2006.01)
*H01M 4/72* (2006.01)
*H01M 4/58* (2010.01)

(52) U.S. Cl.
USPC .................. 429/238; 429/233; 429/218.1

(58) Field of Classification Search
USPC ..................... 429/238, 233, 218.1
See application file for complete search history.

(56) References Cited

U.S. PATENT DOCUMENTS

| | | |
|---|---|---|
| 6,221,531 B1 | 4/2001 | Vaughey et al. |
| 6,528,208 B1 | 3/2003 | Thackeray et al. |
| 6,730,429 B2 | 5/2004 | Thackeray et al. |
| 7,195,842 B1 | 3/2007 | Fujimoto et al. |
| 2008/0261096 A1 | 10/2008 | Kollmann et al. |
| 2009/0162746 A1 | 6/2009 | Honda |
| 2009/0202908 A1 | 8/2009 | Sumihara et al. |
| 2010/0126849 A1 | 5/2010 | Lopatin et al. |
| 2010/0193365 A1 | 8/2010 | Lopatin et al. |
| 2010/0216026 A1 | 8/2010 | Lopatin et al. |
| 2010/0261058 A1 | 10/2010 | Lopatin et al. |

OTHER PUBLICATIONS

International Search Report and Written Opinion dated Jul. 19, 2011 for International Application No. PCT/US2010/053613.
Trahey et al., "High-Capacity, Microporous $Cu_6Sn_5$-Sn Anodes for Li-Ion Batteries." Journal of the Electrochemical Society, 156 (5) A385-A389 (2009).

*Primary Examiner* — Helen O Conley
(74) *Attorney, Agent, or Firm* — Patterson & Sheridan, LLP

(57) ABSTRACT

Embodiments of the present invention generally relate to lithium-ion batteries, and more specifically, to a system and method for fabricating such batteries using thin-film processes that form three-dimensional structures. In one embodiment, an anodic structure used to form an energy storage device is provided. The anodic structure comprises a flexible conductive substrate, a plurality of conductive microstructures formed on the conductive substrate, comprising a plurality of columnar projections and dendritic structures formed over the plurality of columnar projections and a plurality of tin particles formed on the plurality of conductive microstructures. In another embodiment, the anodic structure further comprises a tin nucleation layer comprising tin particles formed on the flexible conductive substrate between the flexible conductive substrate and the plurality of conductive microstructures.

5 Claims, 22 Drawing Sheets

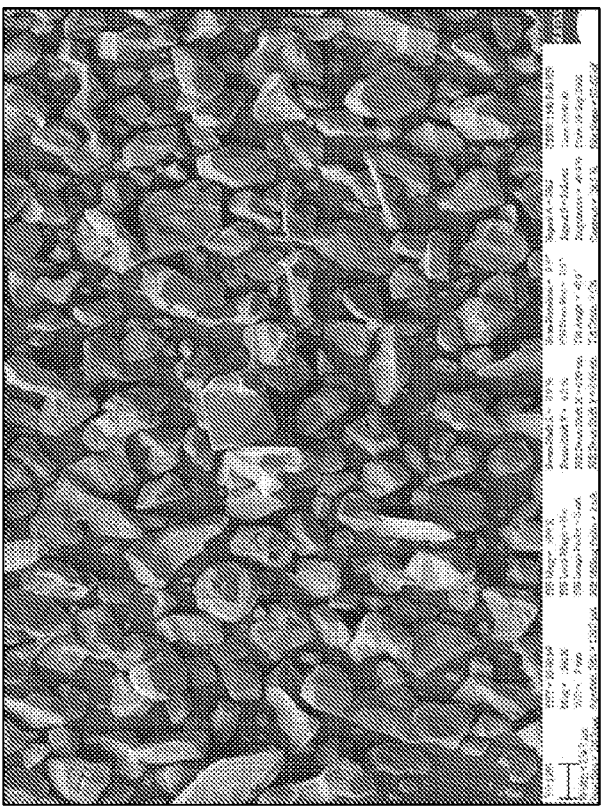

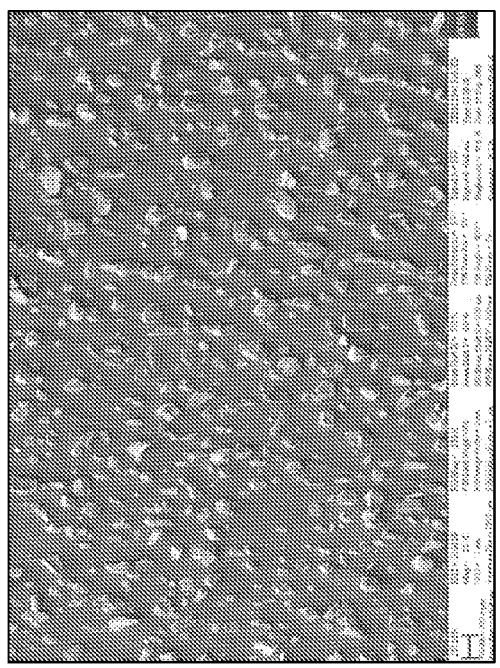
FIG. 10A — 1000 — 1.2V
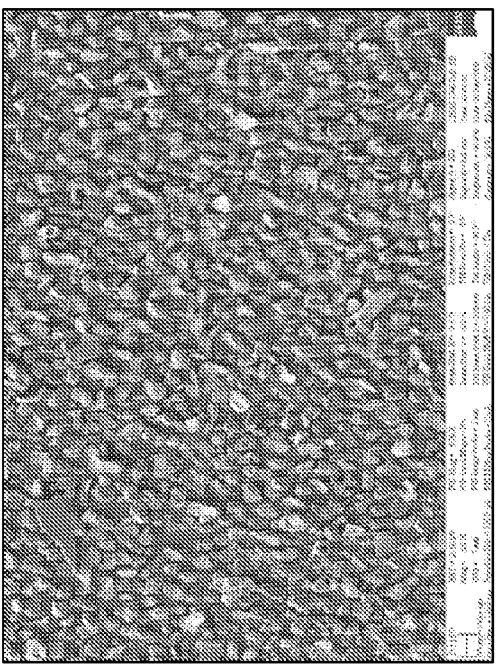
FIG. 10B — 1002 — 1.4V
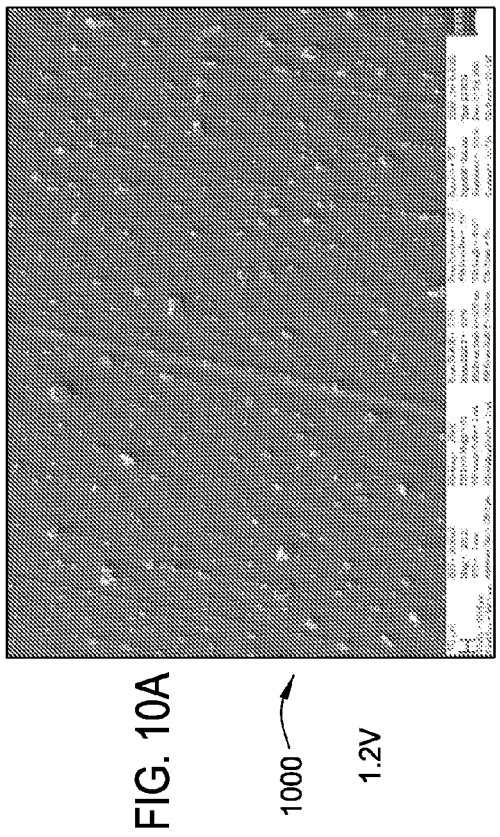
FIG. 10C — 1004 — 1.8V
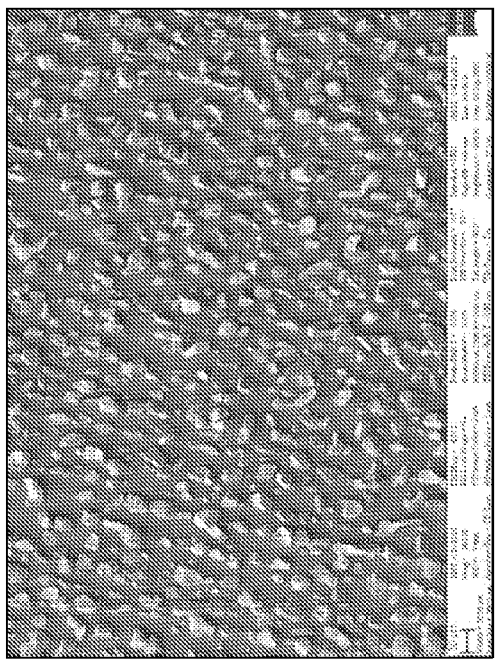
FIG. 10D — 1006 — 2.0V

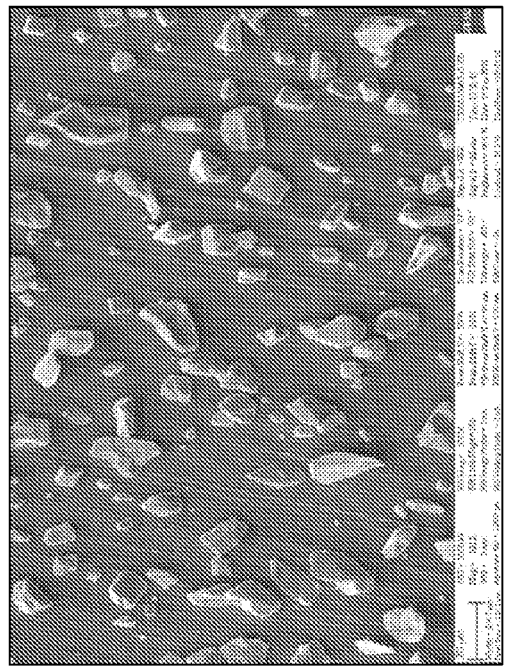
FIG. 11A 1100 1.2V
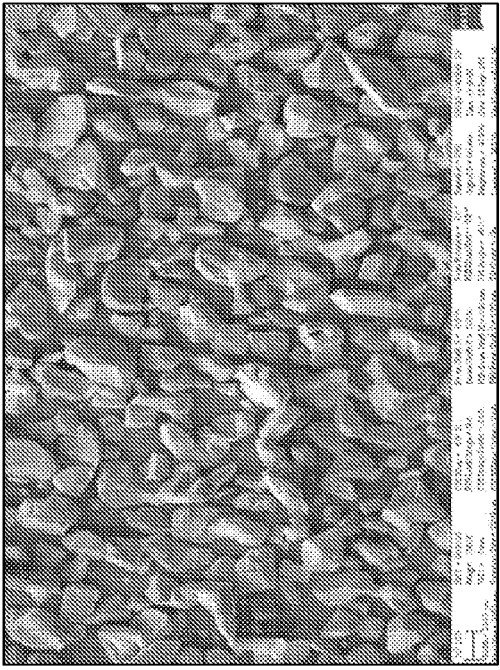
FIG. 11B 1102 1.4V
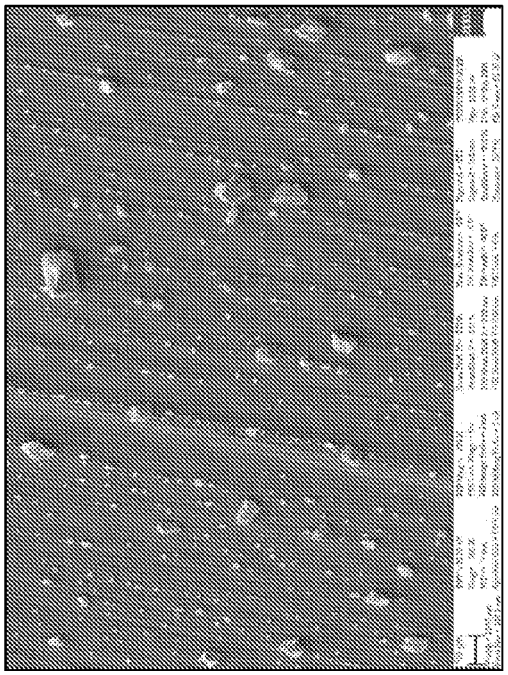
FIG. 11C 1104 1.8V
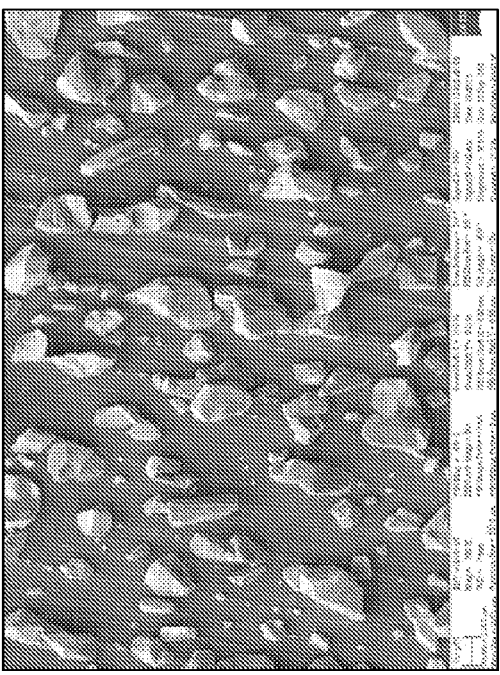
FIG. 11D 1106 2.0V Micro-Sn particles Nano-Sn particles Cu trees after nano-Sn Plating Cu trees before Sn Plating Cu tree before Sn plating Nano-Sn plated around nano-Cu tree ND GROWTH OF TIN
PARTICLES INTO THREE DIMENSIONAL
COMPOSITE ACTIVE ANODE FOR LITHIUM
HIGH CAPACITY ENERGY STORAGE
DEVICE

CROSS-REFERENCE TO RELATED APPLICATIONS

This application claims benefit of U.S. provisional patent application Ser. No. 61/254,365, filed Oct. 23, 2009, which is herein incorporated by reference in its entirety.

BACKGROUND OF THE INVENTION

1. Field of the Invention

Embodiments of the present invention generally relate to lithium-ion batteries, and more specifically, to a system and method for fabricating such batteries using processes that form three-dimensional structures.

2. Description of the Related Art

Fast-charging, high-capacity energy storage devices, such as supercapacitors and lithium- (Li) ion batteries, are used in a growing number of applications, including portable electronics, medical, transportation, grid-connected large energy storage, renewable energy storage, and uninterruptible power supply (UPS). In each of these applications, the charge time and capacity of energy storage devices are important parameters. In addition, the size, weight, and/or expense of such energy storage devices can be significant limitations. Further, low internal resistance is necessary for high performance. The lower the resistance, the less restriction the energy storage device encounters in delivering electrical energy. For example, in the case of super capacitors, lower internal resistance allows faster and more efficient charging and discharging thereof. In the case of a battery, internal resistance in a battery impacts performance by reducing the total amount of useful energy stored by the battery as well as the ability of the battery to deliver the high current.

Accordingly, there is a need in the art for faster charging, higher capacity energy storage devices that are smaller, lighter, and can be more cost effectively manufactured. There is also a need in the art for components for an electrical storage device that reduce the internal resistance of the storage device.

SUMMARY OF THE INVENTION

Embodiments of the present invention generally relate to lithium-ion batteries, and more specifically, to a system and method for fabricating such batteries using thin-film processes that form three-dimensional structures. In one embodiment, an anodic structure used to form an energy storage device is provided. The anodic structure comprises a flexible conductive substrate, a plurality of conductive microstructures formed on the conductive substrate, comprising a plurality of columnar projections and dendritic structures formed over the plurality of columnar projections and a plurality of tin particles formed on the plurality of conductive microstructures. In another embodiment, the anodic structure further comprises a tin nucleation layer comprising tin particles formed on the flexible conductive substrate between the flexible conductive substrate and the plurality of conductive microstructures.

In yet another embodiment, a substrate processing system for processing a flexible conductive substrate is provided. The substrate processing system comprises a first plating chamber configured to deposit tin particles on the flexible conductive substrate, a second plating chamber configured to form a columnar layer of a first metal over the tin particles and the flexible conductive substrate, a third plating chamber configured to form a dendritic structure over the columnar layer, a fourth plating chamber configured to deposit tin particles over the dendritic structure, and a substrate transfer mechanism configured to transfer the flexible conductive substrate among the chambers.

In yet another embodiment, each of the plating chambers of the substrate processing system comprises a chamber body defining a processing volume, wherein the processing volume is configured to retain a plating bath therein, and the chamber body has an upper opening, a draining system configured to drain the plating bath from the processing volume, an anode assembly disposed in the processing volume, wherein the anode assembly comprises an anode immersed in the plating bath, a cathode assembly disposed in the processing volume, and a feed roll disposed outside the processing volume and configured to retain a portion of the flexible conductive substrate, a bottom roll disposed near a bottom portion of the processing volume and configured to retain a portion of the flexible conductive substrate, and a take up roll disposed outside the processing volume and configured to retain a portion of the flexible conductive substrate, wherein the substrate transfer mechanism is configured to activate the feed rolls and the take up rolls to transfer the flexible conductive substrate in and out of each chamber, and hold the flexible conductive substrate in the processing volume of each chamber. The cathode assembly comprises a substrate handler configured to position the flexible conductive substrate substantially parallel to the anode in the processing volume and a contacting mechanism configured to couple an electric bias to the flexible conductive substrate.

In yet another embodiment, a method for forming an anode structure is provided. The method comprises depositing tin particles on a flexible conductive substrate, forming a plurality of conductive columnar microstructures over the tin particles and flexible conductive substrate, forming a dendritic structure over the conductive columnar microstructures, and depositing tin particles over the dendritic structure.

In another embodiment, a method for forming an anode structure is provided. The method comprises forming a conductive columnar microstructure on a flexible conductive substrate, forming a dendritic structure over the conductive columnar microstructure, and depositing tin particles over the dendritic structure.

In another embodiment, a method for forming an anode structure is provided. The method comprises depositing tin particles on a flexible conductive substrate, forming a conductive columnar microstructure over the tin particles and flexible conductive substrate, and forming a dendritic structure over the conductive columnar microstructure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9A is a schematic representation of a scanning electron microscope (SEM) image of tin particles deposited on a copper foil substrate at a magnification of 500×;

FIG. 9B is a schematic representation of a scanning electron microscope (SEM) image of tin particles deposited on a copper foil substrate at a magnification of 200×;

FIGS. 10A-10D are schematic representations of a scanning electron microscope (SEM) image of tin particles deposited at varying voltages on a copper foil substrate at a magnification of 200×;

FIGS. 11A-11D are schematic representations of a scanning electron microscope (SEM) image of tin particles deposited at varying voltages on a copper foil substrate at a magnification of 500×;

DETAILED DESCRIPTION

Figure 6:
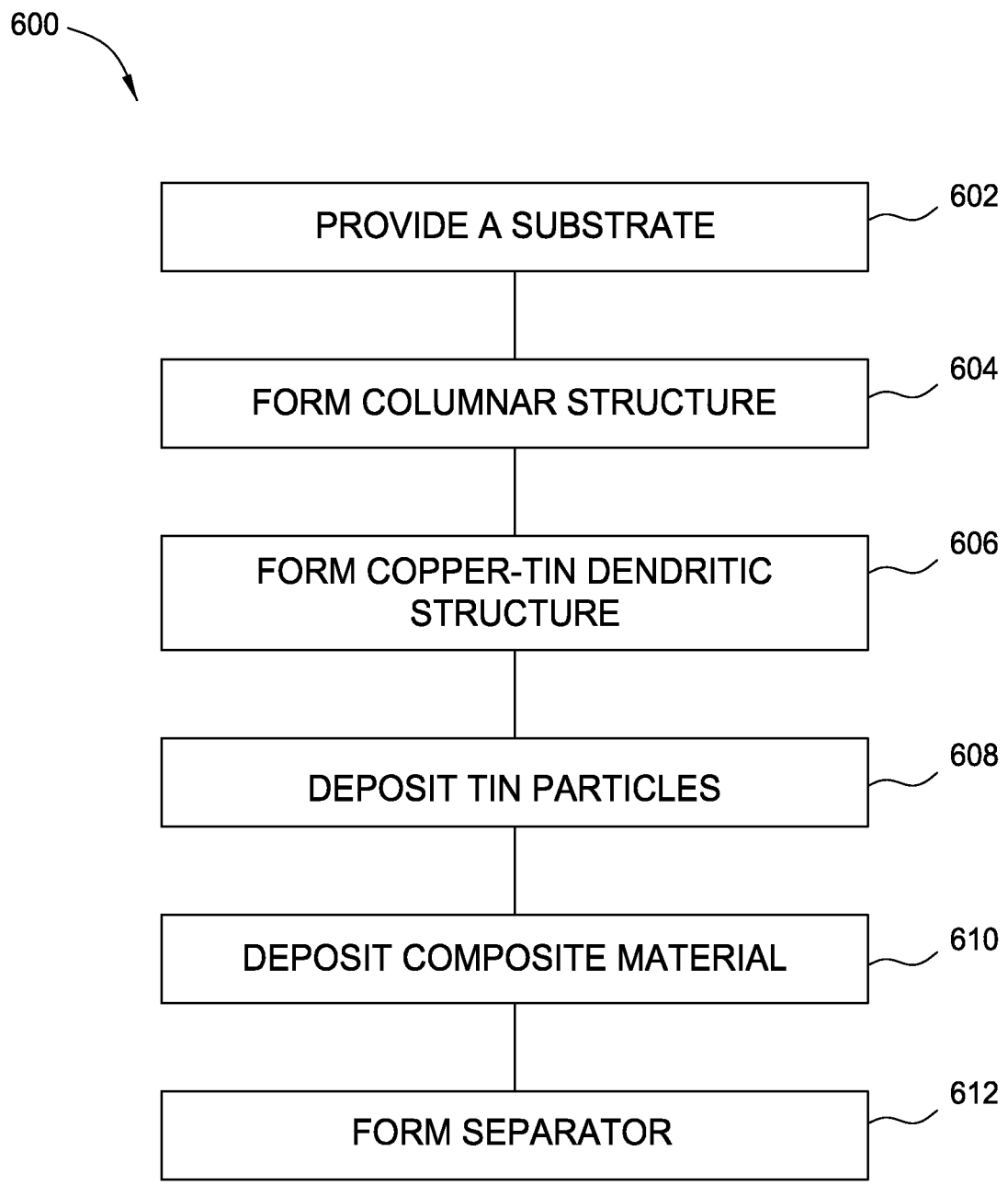
FIG. 6 is a process flow chart summarizing one embodiment of a method for forming an anode structure according to embodiments described herein.

Embodiments of the present invention generally relate to lithium-ion batteries, and more specifically, to a system and method for fabricating such batteries using processes that form three-dimensional structures. In one embodiment, tin particles are plated directly on copper foil. In another embodiment, tin particles are plated into a three-dimensional copper structure. For example, the tin nano-particles may be plated into the copper nano-trees or dendrites and large tin particles may be plated into the middle of the three-dimensional copper structure. In another embodiment, tin particles are plated into a three-dimensional copper-tin alloy. In certain embodiments, the tin particles may be replaced by or used in conjunction with tin nano-wires or nano-rods. Exemplary tin nano-rods are shown in FIG. 6 of commonly assigned U.S. patent application Ser. No. 12/696,422, entitled, "Porous Three Dimensional Copper, Tin, Copper-Tin, Copper-Tin-Cobalt, And Copper-Tin-Cobalt-Titanium Electrodes For Batteries And Ultra Capacitors," filed on Jan. 29, 2010, to Lopatin et al., now published as US 2010/0193365, of which FIG. 6 and the accompanying text is herein incorporated by reference to the extent not inconsistent with the invention. It has been found that the embedding of tin into a three-dimensional conductive structure increases the density of active material present in the three-dimensional conductive structure. It is believed that the tin nano-particles play an important role during lithiation and de-lithiation of a lithium-ion cell.

While the particular apparatus in which the embodiments described herein can be practiced is not limited, it is particularly beneficial to practice the embodiments on a web-based roll-to-roll system sold by Applied Materials, Inc., Santa Clara, Calif. Exemplary roll-to-roll and discrete substrate systems on which the embodiments described herein may be practiced are described in further detail in commonly assigned U.S. patent application Ser. No. 12/620,788, to Lopatin et al., titled APPARATUS AND METHOD FOR FORMING 3D NANOSTRUCTURE ELECTRODE FOR ELECTROCHEMICAL BATTERY AND CAPACITOR, now published as US 2010/0126849, commonly assigned U.S. patent application Ser. No. 12/839,051, filed Jul. 19, 2010, to Bachrach et al., titled COMPRRESSED POWDER 3D BATTERY ELECTRODE MANUFACTURING, and commonly assigned U.S. patent application Ser. No. 12/880,564, to Bachrach et al., titled SPRAY DEPOSITION MOD- ULE FOR AN IN-LINE PROCESSING SYSTEM, all of which are herein incorporated by reference in their entirety.

Figure 1A:
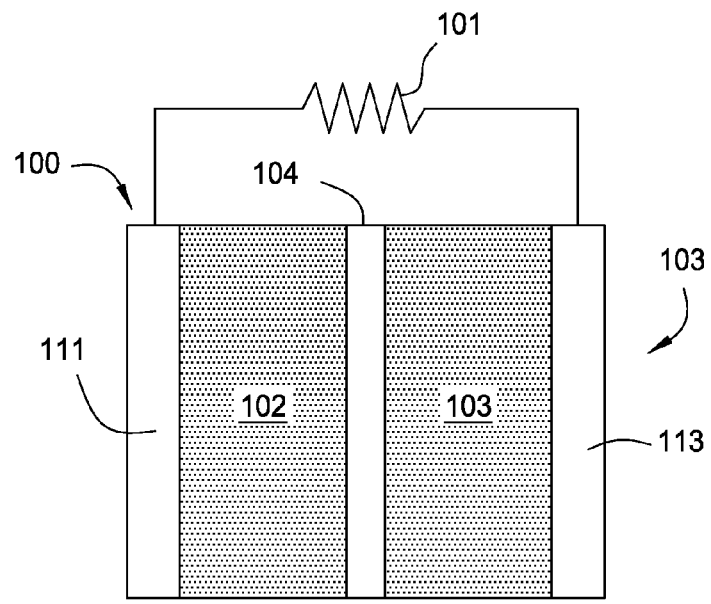
FIG. 1A is a schematic diagram of one embodiment of a Li-ion battery electrically coupled with a load according to embodiments described herein.

FIG. 1A is a schematic diagram of a Li-ion battery 100 electrically connected to a load 101, according to an embodiment described herein. The primary functional components of Li-ion battery 100 include an anode structure 102, a cathode structure 103, a separator layer 104, and an electrolyte (not shown) disposed within the region between the opposing current collectors 111 and 113. A variety of materials may be used as the electrolyte, such as a lithium salt in an organic solvent. Lithium salts may include, for example, $LiPF_6$, $LiBF_4$, or $LiClO_4$, and organic solvents may include, for example, ether and ethylene oxide. The electrolyte conducts Lithium ions, acting as a carrier between the anode structure 102 and the cathode structure 103 when a battery passes an electric current through an external circuit. The electrolyte is contained in anode structure 102, cathode structure 103, and a fluid-permeable separator layer 104 in the region formed between the current collectors 111 and 113.

Anode structure 102 and cathode structure 103 each serve as a half-cell of Li-ion battery 100, and together form a complete working cell of Li-ion battery 100. Both the anode structure 102 and the cathode structure 103 comprise material into which and from which lithium ions can migrate. Anode structure 102 includes a current collector 111 and a conductive microstructure 110 that acts as an intercalation host material for retaining lithium ions. Similarly, cathode structure 103 includes a current collector 113 and an intercalation host material 112 for retaining lithium ions, such as a metal oxide. Separator layer 104 is a dielectric, porous, fluid-permeable layer that prevents direct electrical contact between the components in the anode structure 102 and the cathode structure 103. Methods of forming Li-ion battery 100, as well as the materials that make up the constituent parts of Li-ion battery 100, i.e., anode structure 102, cathode structure 103, and separator layer 104, are described below in conjunction with FIGS. 2A-F.

Rather than the traditional redox galvanic action of a conventional secondary cell, Li-ion secondary cell chemistry depends on a fully reversible intercalation mechanism, in which lithium ions are inserted into the crystalline lattice of an intercalation host material in each electrode without changing the crystal structure of the intercalation host material. Thus, it is necessary for such intercalation host materials in the electrodes of a Li-ion battery to have open crystal structures that allow the insertion or extraction of lithium ions and have the ability to accept compensating electrons at the same time. In Li-ion battery 100, the anode, or negative electrode, is based on a conductive microstructure 110. The conductive microstructure may be a metal selected from a group comprising copper, zinc, nickel, cobalt, palladium, platinum, tin, ruthenium, alloys thereof, and combinations thereof.

The cathode structure 103, or positive electrode, is made from a metal oxide, such as lithium cobalt dioxide ($LiCoO_2$) or lithium manganese dioxide ($LiMnO_2$). The cathode structure 103 may be made from a layered oxide, such as lithium cobalt oxide, a polyanion, such as lithium iron phosphate, a spinel, such as lithium manganese oxide, or $TiS_2$ (titanium disulfide). Exemplary lithium-containing oxides may be layered, such as lithium cobalt oxide ($LiCoO_2$), or mixed metal oxides, such as $LiNi_xCo_{1-2x}MnO_2$, $LiNi_{0.5}Mn_{1.5}O_4$, $Li(Ni_{0.8}Co_{0.15}Al_{0.05})O_2$, $LiMn_2O_4$. Exemplary phosphates may be iron olivine ($LiFePO_4$) and it is variants (such as $LiFe_{1-x}MgPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

Separator layer 104 is configured to supply ion channels for movement between the anode structure 102 and the cathode structure 103 while keeping the anode structure 102 physically separated from the cathode structure 103 to avoid a short. In one embodiment, the separator layer 104 may be formed as an upper layer of the conductive microstructure 110. Alternatively, separator layer 104 may be deposited onto the surface of the conductive microstructure 110 and may be a solid polymer, such as polyolefin, polypropylene, polyethylene, and combinations thereof.

In operation, Li-ion battery 100 provides electrical energy, i.e., energy is discharged, when anode structure 102 and cathode structure 103 are electrically coupled to load 101, as shown in FIG. 1. Electrons originating from the conductive microstructure 110 flow from the current collector 111 of the anode structure 102 through load 101 and current collector 113 to intercalation host material 112 of cathode structure 103. Concurrently, lithium ions are dissociated, or extracted, from the conductive microstructure 110 of anode structure 102, and move through separator layer 104 into intercalation host material 112 of cathode structure 103 and are inserted into the crystal structure of intercalation host material 112. The electrolyte, which resides in the conductive microstructure 110, intercalation host material 112, and separator layer 104, allows the movement of lithium ions from the conductive microstructure 110 to intercalation host material 112 via ionic conduction. Li-ion battery 100 is charged by electrically coupling an electromotive force of an appropriate polarity to anode structure 102 and cathode structure 103 in lieu of the load 101. Electrons then flow from current collector 113 of cathode structure 103 to current collector 111 of anode structure 102, and lithium ions move from intercalation host material 112 in cathode structure 103, through separator layer 104, and into the conductive microstructure 110 of anode structure 102. Thus, lithium ions are intercalated into cathode structure 103 when Li-ion battery 100 is discharged and into anode structure 102 when Li-ion battery 100 is in the charged state.

When a great enough potential is established on the anode structure 102 and appropriate organic solvents are used as the electrolyte, the solvent is decomposed and forms a solid layer called the solid electrolyte interphase (SEI) at first charge that is electrically insulating yet sufficiently conductive to lithium ions. The SEI prevents decomposition of the electrolyte after the second charge. The SEI can be thought of as a three layer system with two important interfaces. In conventional electrochemical studies, it is often referred to as an electrical double layer. In its simplest form, an anode coated by an SEI will undergo three steps when charged: electron transfer between the anode (M) and the SEI ($M^0 - ne \rightarrow M^{n+}_{M/SEI}$); cation migration from the anode-SEI interface to the SEI-electrolyte (E) interface ($M^{n+}_{M/SEI} \rightarrow M^{n+}_{SEI/E}$); and cation transfer in the SEI to electrolyte at the SEI/electrolyte interface ($E(solv) + M^{n+}_{SEI/E} \rightarrow M^{n+}E(solv)$).

The power density and recharge speed of the battery is dependent on how quickly the anode can release and gain charge. This, in turn, is dependent on how quickly the anode can exchange $Li^+$ with the electrolyte through the SEI. $Li^+$ exchange at the SEI is a multi-step process as previously described, and as with most multi-step processes, the speed of the entire process is dependent upon the slowest step. Studies have shown that anion migration is the bottleneck for most systems. It was also found that the diffusive characteristics of the solvents dictate the speed of migration between the anode- SEI interface and the SEI-electrolyte (E) interface. Thus, the best solvents have little mass in order to maximize the speed of diffusion.

Although the specific properties and reactions that take place at the SEI are not well understood, it is known that these properties and reactions can have profound effects on the cyclability and capacity of the anode structure. It is believed that when cycled, the SEI can thicken, making diffusion from the Electrode/SEI interface to the SEI/Electrolyte interface longer. This, in turn, causes the battery to have much lower power density. Furthermore, the thickening of the SEI can damage the fragile microstructures of the high surface area of the microstructures of the nano-materials.

Figure 1B:
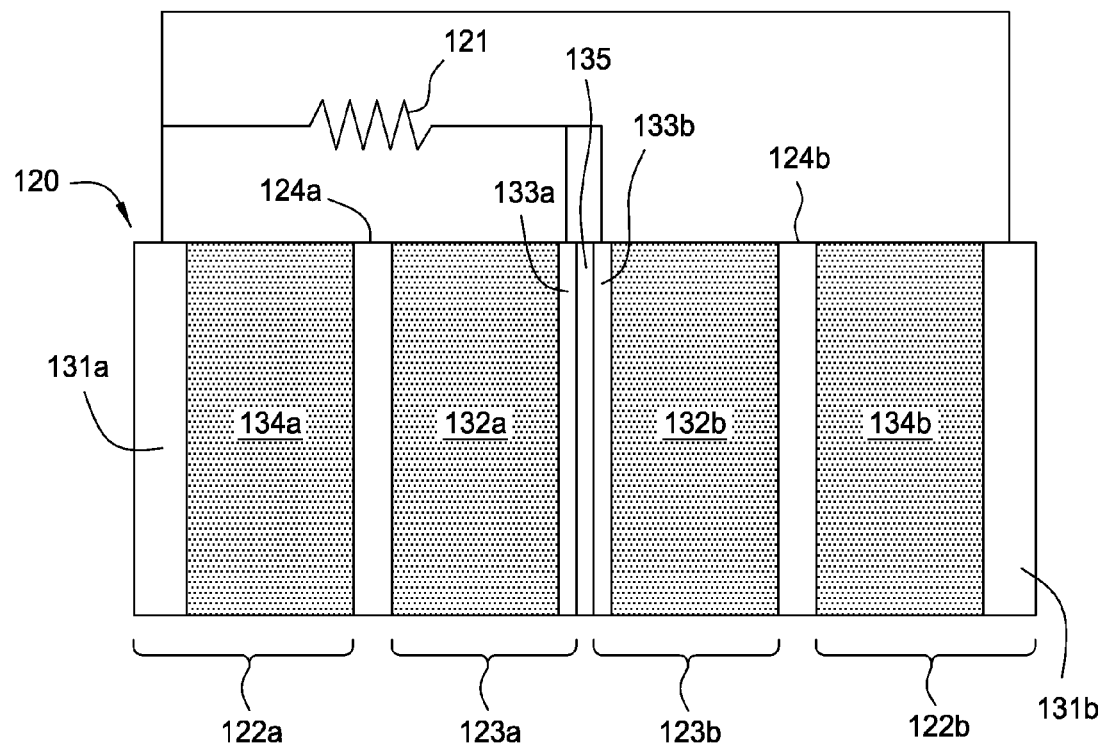
FIG. 1B is a schematic diagram of another embodiment of a Li-ion battery cell bi-layer electrically connected to a load according to embodiments described herein.

FIG. 1B is a schematic diagram of a single sided Li-ion battery cell bi-layer 120 with anode structures 122a, 122b electrically connected to a load 121, according to one embodiment described herein. The single sided Li-ion battery cell bi-layer 120 functions similarly to the Li-ion battery 100 depicted in FIG. 1A. The primary functional components of Li-ion battery cell bi-layer 120 include anode structures 122a, 122b, cathode structures 123a, 123b, separator layers 124a, 124b, and an electrolyte (not shown) disposed within the region between the current collectors 131a, 131b, 133a, and 133b. The Li-ion battery cell 120 is hermetically sealed with electrolyte in a suitable package with leads for the current collectors 131a, 131b, 133a, and 133b. The anode structures 122a, 122b, cathode structures 123a, 123b, and fluid-permeable separator layers 124a, 124b are immersed in the electrolyte in the region formed between the current collectors 131a and 133a and the region formed between the current collectors 131b and 133b. An insulator layer 135 is disposed between current collector 133a and current collector 133b.

Anode structures 122a, 122b and cathode structures 123a, 123b each serve as a half-cell of Li-ion battery cell 120, and together form a complete working bi-layer cell of Li-ion battery 120. Anode structures 122a, 122b each include a metal current collector 131a, 131b and a first electrolyte containing material 134a, 134b. Similarly, cathode structures 123a, 123b include a current collector 133a and 133b respectively and a second electrolyte containing material 132a, 132b, such as a metal oxide, for retaining lithium ions. The current collectors 131a, 131b, 133a, and 133b are made of electrically conductive material such as metals. In some cases, a separator layer 124a, 124b, which is an insulating, porous, fluid-permeable layer, for example, a dielectric layer, may be used to prevent direct electrical contact between the components in the anode structures 122a, 122b and the cathode structures 123a, 123b.

Figure 2A:
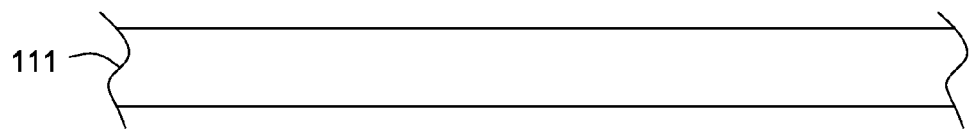
FIGS. 2A-2F are schematic cross-sectional views of one embodiment of an anodic structure formed according to embodiments described herein.

FIGS. 2A-2F are schematic cross-sectional views of an anode structure formed according to embodiments described herein. In FIG. 2A, current collector 111 is schematically illustrated prior to the deposition of the tin nucleation layer 202 and the conductive columnar microstructures 211. Current collector 111 may include a relatively thin conductive layer disposed on a substrate or simply a conductive substrate (e.g., foil, sheet, or plate), comprising one or more materials, such as metal, plastic, graphite, polymers, carbon containing polymers, composites or other suitable materials. Examples of metals that current collector 111 may be comprised of include copper (Cu), zinc (Zn), nickel (Ni), cobalt (Co), palladium (Pd), platinum (Pt), tin (Sn), ruthenium (Ru), stainless steel, alloys thereof, and combinations thereof. In one embodiment, current collector 111 is a metallic foil and may have an insulating coating disposed thereon. Alternatively, current collector 111 may comprise a host substrate that is non-conductive, such as a glass, silicon, plastic or a polymeric substrate that has an electrically conductive layer formed thereon by means known in the art, including physical vapor deposition (PVD), electrochemical plating, electroless plating, and the like. In one embodiment, the current collector 111 is formed out of a flexible host substrate. The flexible host substrate may be a lightweight and inexpensive plastic material, such as polyethylene, polypropylene or other suitable plastic or polymeric material, with a conductive layer formed thereon. Materials suitable for use as such a flexible substrate include a polyimide (e.g., KAPTON™ by DuPont Corporation), polyethyleneterephthalate (PET), polyacrylates, polycarbonate, silicone, epoxy resins, silicone-functionalized epoxy resins, polyester (e.g., MYLAR™ by E.I. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylenenaphthalene (PEN). Alternately, the flexible substrate may be constructed from a relatively thin glass that is reinforced with a polymeric coating.

Figure 2B:
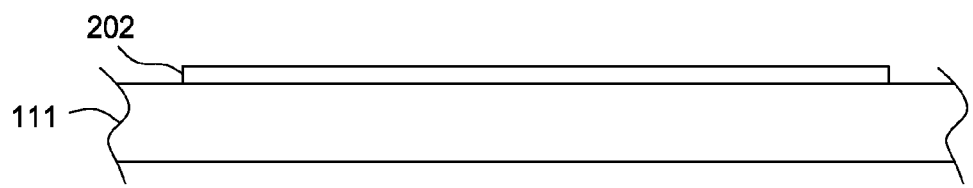

As shown in FIG. 2B, tin particles represented by nucleation layer 202 may be deposited over the current collector 111. In one embodiment, the tin particles function as a nucleation layer for subsequently deposited materials.

Figure 2C:
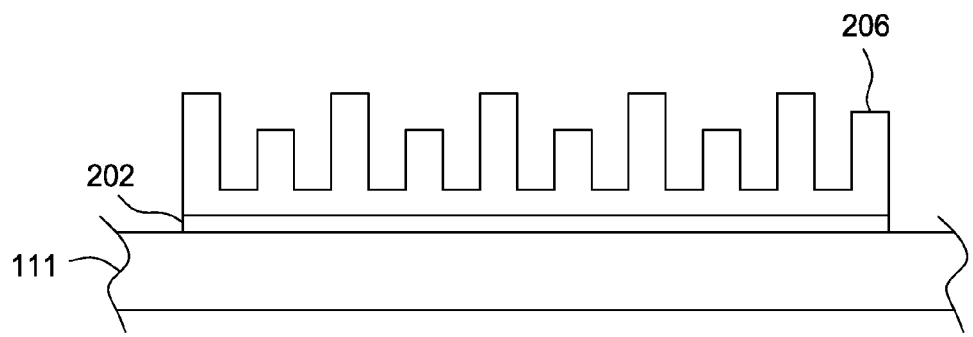
Figure 2D:
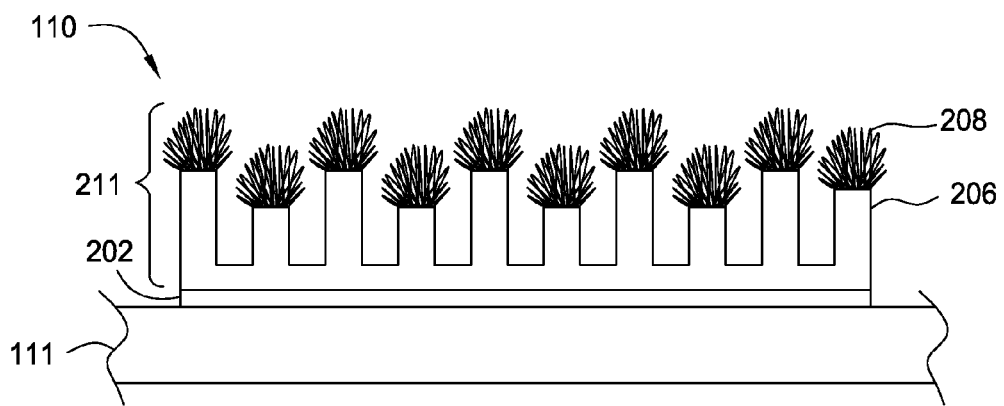

As shown in FIGS. 2C and 2D, the conductive microstructures 211 including the columnar projections 206 and dendritic structures 208 are formed over the tin nucleation layer 202. Formation of the conductive microstructures 211 includes establishing process conditions under which evolution of hydrogen results in the formation of a porous metal film. In one embodiment, such process conditions are achieved by performing at least one of: increasing the concentration of metal ions near the cathode (e.g., seed layer surface) by reducing the diffusion boundary layer, and by increasing the metal ion concentration in the electrolyte bath. It should be noted that the diffusion boundary layer is strongly related to the hydrodynamic boundary layer. If the metal ion concentration is too low and/or the diffusion boundary layer is too large at a desired plating rate the limiting current ($i_L$) will be reached. The diffusion limited plating process created when the limiting current is reached, prevents the increase in plating rate by the application of more power (e.g., voltage) to the cathode (e.g., metalized substrate surface). When the limiting current is reached, low density columnar projections 206 are produced resulting in dendritic type film growth that occurs due to the mass transport limited process.

Next, three-dimensional porous metallic structures or dendritic structures 208 are formed on the columnar projections 206 as shown in FIG. 2D. The dendritic structures 208 may be formed on the columnar projections 206 by increasing the voltage and corresponding current density from the deposition of the columnar projections 206. In one embodiment, the dendritic structures are formed by an electrochemical plating process in which the over potential, or applied voltage used to form the dendritic structures 208 is significantly greater than that used to form the columnar projections 206, thereby producing a three dimensional low-density metallic dendritic structure on the columnar projections 206. In one embodiment, the dendritic structures 208 are formed using an electroless process. In one embodiment, the deposition bias generally has a current density of about 10 $A/cm^2$ or less. In another embodiment, the deposition bias generally has a current density of about 5 $A/cm^2$ or less. In yet another embodiment, the deposition bias has a current density of about 3 $A/cm^2$ or less. In one embodiment, the deposition bias has a current density in the range from about 0.3 $A/cm^2$ to about 3.0 $A/cm^2$. In another embodiment, the deposition bias has a current density in the range of about 1 A/cm$^2$ and about 2 A/cm$^2$. In yet another embodiment, the deposition bias has a current density in the range of about 0.5 A/cm$^2$ and about 2 A/cm$^2$. In yet another embodiment, the deposition bias has a current density in the range of about 0.3 A/cm$^2$ and about 1 A/cm$^2$. In yet another embodiment, the deposition bias has a current density in the range of about 0.3 A/cm$^2$ and about 2 A/cm$^2$. In one embodiment, the dendritic structures 208 have a porosity of between 30% and 70%, for example, about 50%, of the total surface area.

In one embodiment, the conductive microstructures 211 may comprise one or more of various forms of porosities. In one embodiment, the conductive microstructures 211 comprise a macro-porous structure having macro-pores of about 100 microns or less in diameter. In one embodiment, the macro-pores are sized within a range between about 5 and about 100 microns (pm). In another embodiment, the average size of the macro-pores is about 30 microns in size. The conductive microstructures 211 may also comprise a second type, or class, of pore structures that are formed between the columnar projections 206 and/or main central bodies of the dendrites 208, which is known as a meso-porous structure. The meso-porous structure may have a plurality of meso-pores that are less than about 1 micron in size or diameter. In another embodiment, the meso-porous structure may have a plurality of meso-pores that are between about 100 nm to about 1,000 nm in size or diameter. In one embodiment, the meso-pores are between about 2 nm to about 50 nm in diameter. Additionally, the conductive microstructures 211 may also comprise a third type, or class, of pore structures that are formed between the dendrites, which is known as a nano-porous structure. In one embodiment, the nano-porous structure may have a plurality of nano-pores that are sized less than about 100 nm in diameter. In another embodiment, the nano-porous structure may have a plurality of nano-pores that are less than about 20 nm in size or diameter. The combination of micro-porous, meso-porous, and nano-porous structures yields a significant increase in the surface area of the conductive microstructures 211.

In one embodiment, the dendritic structures 208 may be formed from a single material, such as copper, zinc, nickel, cobalt, palladium, platinum, tin, ruthenium, and other suitable materials. In another embodiment, the dendritic structures 208 may comprise alloys of copper, zinc, nickel, cobalt, palladium, platinum, tin, ruthenium, combinations thereof, alloys thereof, or other suitable materials. In one embodiment, the dendritic structures 208 comprise a copper-tin alloy.

Figure 2E:
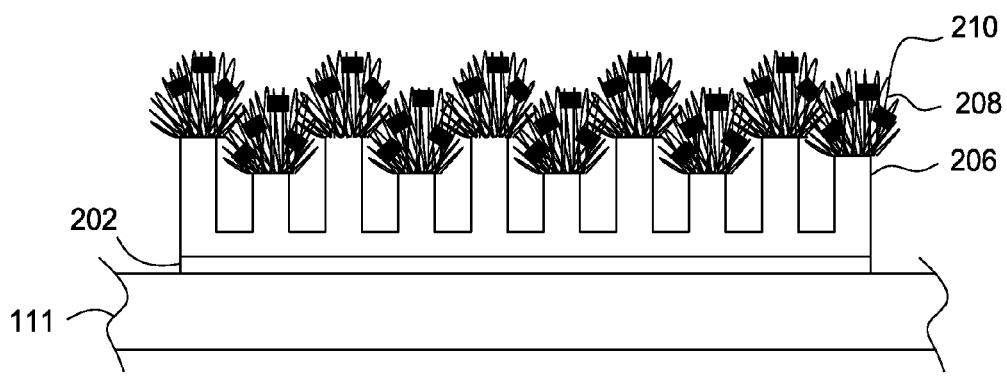

In one embodiment, as shown in FIG. 2E, tin particles 210 are formed over the conductive microstructures 211. The tin particles 210 can be formed by a process selected from the group comprising an electrochemical plating process (ECP), a physical vapor deposition process (PVD), an electroless process, and combinations thereof. The tin particles 210 assist in providing high capacity and long cycle life for the electrode to be formed. In one embodiment, the tin particles 210 have a particle size of between about 10 nm and about 1,000 nm. In another embodiment, the tin particles 210 have a particle size between about 50 nm and about 100 nm. In yet another embodiment, the tin particles 210 have a particle size between about 100 nm and about 1,000 nm. In another embodiment, the tin particles 210 have a particle size of between about 10 nm and about 50 nm.

In one embodiment, the tin nucleation layer 202 and the tin particles 210 are formed by an electroplating process in processing chambers that may be adapted to perform one or more of the process steps described herein, such as the SLIM-CELL® electroplating chamber available from Applied Materials, Inc. of Santa Clara, Calif. Another electroplating chamber that may be adapted to perform one or more of the processing steps described herein is a roll-to-roll processing chamber described in commonly assigned U.S. patent application Ser. No. 12/620,788 titled APPARATUS AND METHOD FOR FORMING 3D NANOSTRUCTURE ELECTRODE FOR ELECTROCHEMICAL BATTERY AND CAPACITOR, filed Nov. 18, 2009, to Lopatin et al., now published as US 2010/0126849, which is hereby incorporated by reference in its entirety. Other processing chambers and systems, including those available from other manufactures may also be used to practice the embodiments described herein. One exemplary processing system includes a roll-to-roll processing system described herein.

The processing chamber includes a suitable plating solution. Suitable plating solutions that may be used with the processes described herein include electrolyte solutions containing a metal ion source, an acid solution, and optional additives.

Plating Solutions:

In one embodiment, the plating solution contains a metal ion source and at least one or more acid solutions. Suitable acid solutions include, for example, inorganic acids such as sulfuric acid, phosphoric acid, pyrophosphoric acid, perchloric acid, acetic acid, citric acid, combinations thereof, as well as acid electrolyte derivatives, including ammonium and potassium salts thereof.

In one embodiment, the metal ion source within the plating is a copper ion source. Useful copper sources include copper sulfate ($CuSO_4$), copper (I) sulfide ($Cu_2S$), copper (II) sulfide (CuS), copper (I) chloride (CuCl), copper (II) chloride ($CuCl_2$), copper acetate ($Cu(CO_2CH_3)_2$), copper pyrophosphate ($Cu_2P_2O_7$), copper fluoroborate ($Cu(BF_4)_2$), copper acetate (($CH_3CO_2)_2Cu$), copper acetylacetonate (($C_5H_7O_2)_2Cu$), copper phosphates, copper nitrates, copper carbonates, copper sulfamate, copper sulfonate, copper pyrophosphate, copper cyanide, derivatives thereof, hydrates thereof or combinations thereof. Some copper sources are commonly available as hydrate derivatives, such as $CuSO_4 5H_2O$, $CuCl_2 2H_2O$ and $(CH_3CO_2)_2CuH_2O$. The electrolyte composition can also be based on the alkaline copper plating baths (e.g., cyanide, glycerin, ammonia, etc.) as well. In one embodiment, the concentration of copper ions in the electrolyte may range from about 0.1 M to about 1.1 M. In one embodiment, the concentration of copper ions in the electrolyte may range from about 0.4 M to about 0.9 M.

Optionally, the plating solution may include one or more additive compounds. In certain embodiments, the plating solution contains an oxidizer. As used herein, an oxidizer may be used to oxidize a metal layer to a corresponding oxide, for example, copper to copper oxide. Examples of suitable oxidizers include peroxy compounds, e.g., compounds that may disassociate through hydroxy radicals, such as hydrogen peroxide and its adducts including urea hydrogen peroxide, percarbonates, and organic peroxides including, for example, alkyl peroxides, cyclical or aryl peroxides, benzoyl peroxide, peracetic acid, and di-t-butyl peroxide. Sulfates and sulfate derivatives, such as monopersulfates and dipersulfates may also be used including for example, ammonium peroxydisulfate, potassium peroxydisulfate, ammonium persulfate, and potassium persulfate. Salts of peroxy compounds, such as sodium percarbonate and sodium peroxide may also be used. In one embodiment, the oxidizer can be present in the plating solution in an amount ranging between about 0.001% and about 90% by volume or weight. In another embodiment, the oxidizer can be present in the plating solution in an amount ranging between about 0.01% and about 20% by volume or weight. In yet another embodiment, the oxidizer can be present in the plating solution in an amount ranging between about 0.1% and about 15% by volume or weight.

In certain embodiments, it is desirable to add a low cost pH adjusting agent, such as potassium hydroxide (KOH) or sodium hydroxide (NaOH) to form an inexpensive electrolyte that has a desirable pH to reduce the cost of ownership required to form an energy device. In some cases it is desirable to use tetramethylammonium hydroxide (TMAH) to adjust the pH.

In one embodiment, it may be desirable to add a second metal ion to the primary metal ion containing electrolyte bath (e.g., copper ion containing bath) that will plate out or be incorporated in the growing electrochemically deposited layer or on the grain boundaries of the electrochemically deposited layer. The formation of a metal layer that contains a percentage of a second element can be useful to reduce the intrinsic stress of the formed layer and/or improve its electrical and electromigration properties. In one example, the metal ion source within the electrolyte solution is an ion source selected from a group comprising silver, tin, zinc, cobalt, nickel ion sources, and combinations thereof. In one embodiment, the concentration of silver (Ag), tin (Sn), zinc (Zn), cobalt (Co), or nickel (Ni) ions in the electrolyte may range from about 0.1 M to about 0.4 M.

Examples of suitable nickel sources include nickel sulfate, nickel chloride, nickel acetate, nickel phosphate, derivatives thereof, hydrates thereof or combinations thereof.

Examples of suitable tin sources include soluble tin compounds. A soluble tin compound can be a stannic or stannous salt. The stannic or stannous salt can be a sulfate, an alkane sulfonate, or an alkanol sulfonate. For example, the bath soluble tin compound can be one or more stannous alkane sulfonates of the formula:

where R is an alkyl group that includes from one to twelve carbon atoms. The stannous alkane sulfonate can be stannous methane sulfonate with the formula:

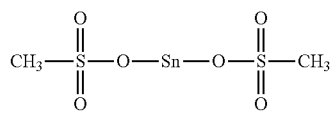

and the bath soluble tin compound can also be stannous sulfate of the formula: $SnSO_4$.

Examples of the soluble tin compound can also include tin(II) salts of organic sulfonic acid such as methanesulfonic acid, ethanesulfonic acid, 2-propanolsulfonic acid, p-phenolsulfonic acid and like, tin(II) borofluoride, tin(II) sulfosuccinate, tin(II) sulfate, tin(II) oxide, tin(II) chloride and the like. These soluble tin(II) compounds may be used alone or in combination of two or more kinds.

Example of suitable cobalt sources may include cobalt salts selected from cobalt sulfate, cobalt nitrate, cobalt chloride, cobalt bromide, cobalt carbonate, cobalt acetate, ethylene diamine tetraacetic acid cobalt, cobalt (II) acetyl acetonate, cobalt (III) acetyl acetonate, glycine cobalt (III), cobalt pyrophosphate, and combinations thereof.

The plating solution may also contain manganese or iron at a concentration within a range from about 20 ppm to about 600 ppm. In another embodiment, the plating solution may contain manganese or iron at a concentration within a range from about 100 ppm to about 400 ppm. Possible iron sources include iron(II) chloride ($FeCl_2$) including hydrates, iron (III) chloride ($FeCl_3$), iron (II) oxide (FeO), Iron (II, III) oxide ($Fe_3O_4$), and Iron (III) oxide ($Fe_2O_3$). Possible manganese sources include manganese (IV) oxide ($MnO_2$), manganese (II) sulfate monohydrate ($MnSO_4.H_2O$), manganese (II) chloride ($MnCl_2$), manganese (III) chloride ($MnCl_3$), manganese fluoride ($MnF_4$), and manganese phosphate ($Mn_3(PO_4)_2$).

In one embodiment, the plating solution contains free copper ions in place of copper source compounds and complexed copper ions.

In certain embodiments, the plating solution may also comprise at least one complexing agent or chelator to form complexes with the copper ions while providing stability and control during the deposition process. Complexing agents also provide buffering characteristics for the electroless copper solution. Complexing agents generally have functional groups, such as carboxylic acids, dicarboxylic acids, polycarboxylic acids, amino acids, amines, diamines or polyamines. Specific examples of useful complexing agents for the electroless copper solution include ethylene diamine tetraacetic acid (EDTA), ethylene diamine (EDA), citric acid, citrates, glyoxylates, glycine, amino acids, derivatives thereof, salts thereof or combinations thereof. In one embodiment, the plating solution may have a complexing agent at a concentration within a range from about 50 mM to about 500 mM. In another embodiment, the plating solution may have a complexing agent at a concentration within a range from about 75 mM to about 400 mM. In yet another embodiment, the plating solution may have a complexing agent at a concentration within a range from about 100 mM to about 300 mM, such as about 200 mM. In one embodiment, an EDTA source is the preferred complexing agent within the plating solution. In one example, the plating solution contains about 205 mM of an EDTA source. The EDTA source may include EDTA, ethylenediaminetetraacetate, salts thereof, derivatives thereof or combinations thereof.

In certain embodiments, the plating solution contains at least one reductant. Reductants provide electrons to induce the chemical reduction of copper ions while forming and depositing the copper material, as described herein. Reductants include organic reductants (e.g., glyoxylic acid or formaldehyde), hydrazine, organic hydrazines (e.g., methyl hydrazine), hypophosphite sources (e.g., hypophosphorous acid ($H_3PO_2$), ammonium hypophosphite (($NH_4)_{4-x}H_xPO_2$) or salts thereof), borane sources (e.g., dimethylamine borane complex (($CH_3)_2NHBH_3$, DMAB), trimethylamine borane complex (($CH_3)_3NBH_3$), TMAB), tert-butylamine borane complex ($tBuNH_2BH_3$), tetrahydrofuran borane complex ($THFBH_3$), pyridine borane complex ($C_5H_5NBH_3$), ammonia borane complex ($NH_3BH_3$), borane ($BH_3$), diborane ($B_2H_6$), derivatives thereof, complexes thereof, hydrates thereof or combinations thereof. In one embodiment, the plating solution may have a reductant at a concentration within a range from about 20 mM to about 500 mM. In another embodiment, the plating solution may have a reductant at a concentration within a range from about 100 mM to about 400 mM. In yet another embodiment, the plating solution may have a reductant at a concentration within a range from about 150 mM to about 300 mM, such as about 220 mM. Preferably, an organic reductant or organic-containing reductant is utilized within the plating solution, such as glyoxylic acid or a glyoxylic acid source. The glyoxylic acid source may include glyoxylic acid, glyoxylates, salts thereof, complexes thereof, derivatives thereof or combinations thereof. In a preferred example, glyoxylic acid monohydrate ($HCOCO_2H.H_2O$) is contained within the electroless copper solution at a concentration of about 217 mM.

The plating solution may contain other additives to help accelerate the deposition process. Useful accelerators typically include sulfides or disulfides, such as bis(3-sulfopropyl) disulfide, which compete with suppressors for adsorption sites, accelerating copper deposition in adsorbed areas.

The plating solution may also have a surfactant. The surfactant acts as a wetting agent to reduce the surface tension between the electroless copper solution and the substrate surface. In one embodiment, the plating solution generally contains a surfactant at a concentration of about 1,000 ppm or less. In another embodiment, the plating solution generally contains a surfactant at a concentration of about 500 ppm or less, such as within a range from about 100 ppm to about 300 ppm. The surfactant may have ionic or non-ionic characteristics. A preferred surfactant includes glycol ether based surfactants, such as polyethylene glycol (PEG), polypropylene glycol (PPG) or the like. Due to beneficial characteristics, PEG and PPG may be used as a surfactant, an inhibitor and/or a suppressor. In one example, a glycol ether based surfactant may contain polyoxyethylene units, such as TRITON® 100, available from The Dow Chemical Company. Other surfactants that may be used within the electroless copper solution include dodecyl sulfates, such as sodium dodecyl sulfate (SDS). The surfactants may be single compounds or a mixture of compounds having molecules that contain varying lengths of hydrocarbon chains.

The balance or remainder of the plating solution described above may be a solvent, such as a polar solvent, including water, such as deionized water, and organic solvents, for example, alcohols or glycols.

In one embodiment, the plating solution comprises 43 g/L of $SnSO_4$, 80 ml/L of $H_2SO_4$, 250 g/L of sodium citrate, and the remainder DI water to 1L is provided. This plating solution may be used for plating tin directly on copper foil, plating tin inside a three-dimensional copper-tin structure, and plating tin inside of a three-dimensional copper structure.

In another embodiment, the plating solution comprises 60 g/L of $CuSO_4$, 43 g/L of $SnSO_4$, 80 ml/L of $H_2SO_4$, and the remainder DI water to 1 L. This plating solution may be used for plating a three-dimensional copper-tin structure.

In another embodiment, the plating solution comprises 125 g/L of $CuSO_4$, 80 ml/L of $H_2SO_4$, and the remainder DI water to 1 L. This plating solution may be used for plating a three-dimensional copper structure.

Figure 2F:
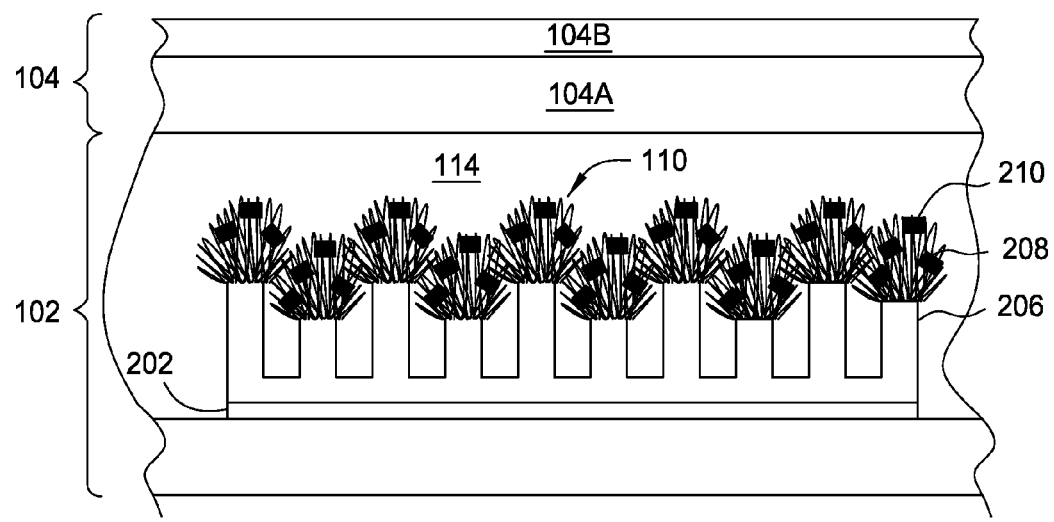

FIG. 2F illustrates the anode structure 102 after formation a separator layer 104 on an optional composite material 114. In one embodiment, the optional composite material 114 is selected from the group comprising silicon, carbon, graphite, $LiTiO_2$, and combinations thereof. In one embodiment, the composite material 114 comprises a mesoporous carbon containing material. The mesoporous carbon containing material 114 is comprised of CVD-deposited carbon fullerene onions connected by carbon nano-tubes (CNTs) in a three-dimensional, high-surface-area lattice that are deposited over the tin particles 210. The mesoporous carbon containing material is further described in commonly assigned U.S. patent application Ser. No. 12/459,313, titled THIN FILM ELECTROCHEMICAL ENERGY STORAGE DEVICE WITH THREE-DIMENSIONAL ANODIC STRUCTURE, filed Jun. 30, 2009, to Lopatin et al., now published as US 2010/0216026, which is hereby incorporated by reference in its entirety.

In one embodiment, the separator layer 104 comprises a polymerized carbon layer 104A and a dielectric layer 104B. In certain embodiments, where the optional composite material 114 is a mesoporous carbon containing material, the polymerized carbon layer 104A comprises a densified layer of mesoporous carbon material on which dielectric layer 104B may be deposited or attached. The polymerized carbon layer 104A has a significantly higher density than mesoporous carbon material, thereby providing a structurally robust surface on which to deposit or attach subsequent layers to form anode structure 102. In one embodiment, the density of polymerized carbon layer 104A is greater than the density of mesoporous carbon material by a factor of approximately 2 to 5. In one embodiment, the surface of mesoporous carbon material is treated with a polymerization process to form polymerized carbon layer 104A on mesoporous carbon containing material. In such an embodiment, any known polymerization process may be used to form polymerized carbon layer 104A, including directing ultra-violet and/or infra-red radiation onto the surface of mesoporous carbon material. In another embodiment, polymerized carbon layer 104A is deposited in-situ as a final step in the formation of the mesoporous carbon material. In such an embodiment, one or more process parameters, e.g., hydrocarbon precursor gas temperature, are changed in a final stage of the deposition of mesoporous carbon material, so that polymerized carbon layer 104A is formed on mesoporous carbon material, as shown.

Dielectric layer 104B comprises a polymeric material and may be deposited as an additional polymeric layer on polymerized carbon layer 104A. Dielectric polymers that may be deposited on polymerized carbon layer 104A to form dielectric layer 104B are discussed above in conjunction with FIG. 1. Alternatively, in one embodiment, polymerized carbon layer 104A may also serve as the dielectric portion of separator layer 104, in which case separator layer 104 consists essentially of a single polymeric material, i.e., polymerized carbon layer 104A.

Figure 3A:
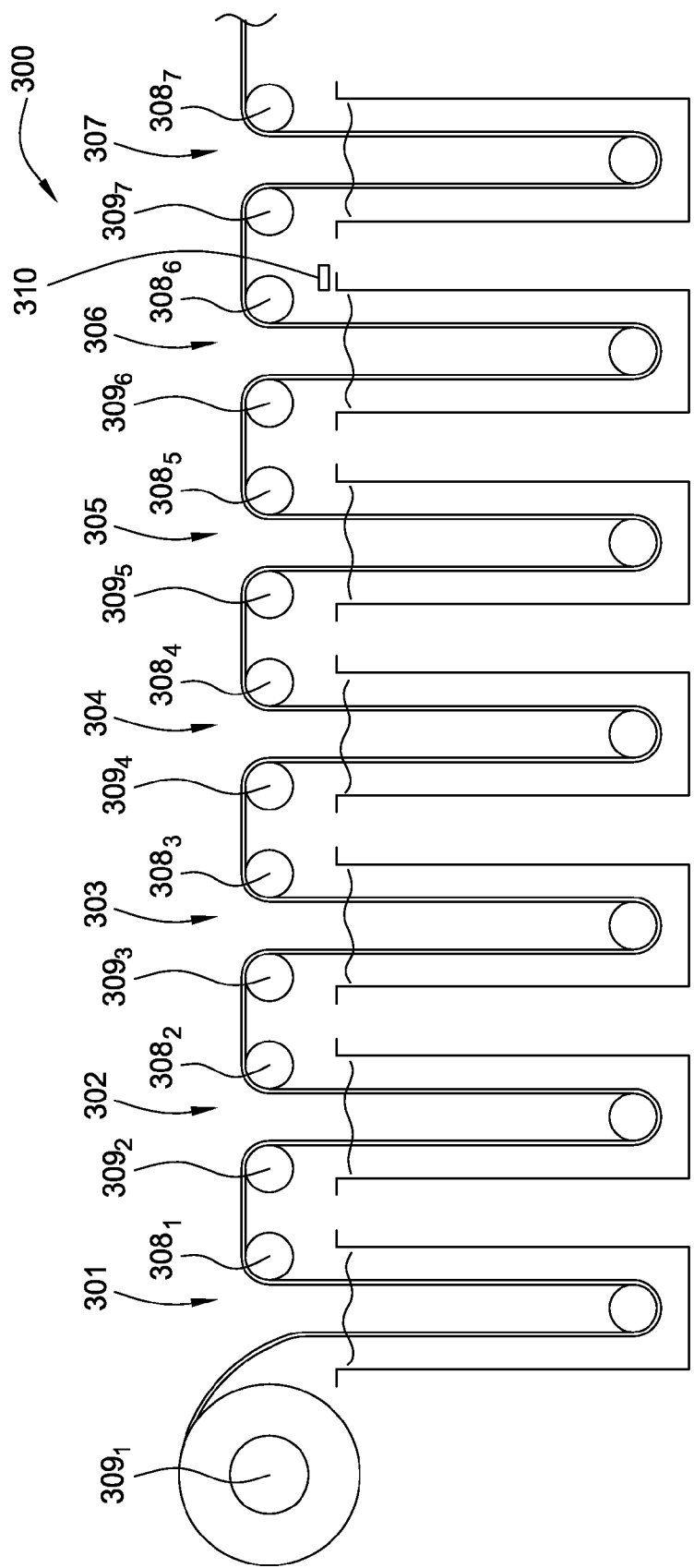
FIG. 3A schematically illustrates one embodiment of a processing system according to embodiments described herein.

FIG. 3 schematically illustrates a processing system 300 comprising a tin deposition chamber 307 which may be used to deposit the tin particles 210 described herein. The processing system 300 generally comprises a plurality of processing chambers arranged in a line, each configured to perform one processing step to a substrate formed on one portion of a continuous flexible base 310.

In one embodiment, the processing system 300 comprises a pre-wetting chamber 301 configured to pre-wet a portion of the flexible base 310. In one embodiment, the pre-wetting chamber 301 may be replaced with a plating chamber for depositing tin particles on the flexible base 310.

The processing system 300 further comprises a first plating chamber 302 configured to perform a first plating process on a portion of the flexible base 310 after being pre-wetted. The first plating chamber 302 is generally disposed next to the cleaning pre-wetting station. In one embodiment, the first plating chamber is adapted to plate tin particles on the flexible base 310.

The processing system 300 further comprises a second plating chamber 303 disposed next to the first plating chamber 302. The second plating chamber 303 is configured to perform a second plating process. In one embodiment, the second plating chamber 303 is adapted to plate a columnar copper layer over the tin particles formed on the portion of the flexible base 310.

The processing system 300 further comprises a third plating chamber 304 disposed next to the second plating chamber 303. The third plating chamber 304 is configured to perform a third plating process. In one embodiment, the third plating chamber 304 is adapted to deposit a porous layer of copper or alloys, such as copper-tin, on the columnar copper layer.

The processing system 300 further comprises a rinsing station 305 disposed next to the third plating chamber 304 and configured to rinse and remove any residual plating solution from the portion of flexible base 310 processed by the third plating chamber 304.

The processing system 300 further comprises a fourth plating chamber 306 disposed next to the rinsing station 305. The fourth plating chamber 306 is configured to perform a fourth plating process. In one embodiment, the fourth plating process involves depositing tin particles described herein over the porous layer.

In certain embodiments, the processing system 300 further comprises a rinse-dry station configured to rinse and dry a portion of flexible base 310 after the plating processes. In one embodiment, the rinse-dry station may comprise one or more vapor jets configured to direct a drying vapor toward the flexible base 310 as the flexible base 310 exits the rinse-dry station.

In certain embodiments, the processing system 300 further comprises a surface modification chamber (not shown) configured to form a passivation film on the portion of the flexible base 310. In certain embodiments, the surface modification chamber may replace the rinse-dry station. Embodiments of the passivation film are further described in commonly assigned U.S. Provisional Patent Application Ser. No. 12/826,204, filed Jun. 29, 2010, titled PASSIVATION FILM FOR SOLID ELECTROLYTE INTERFACE OF THREE DIMENSIONAL COPPER CONTAINING ELECTRODE IN ENERGY STORAGE DEVICE, to Lopatin at al., which is hereby incorporated by reference in its entirety. It should be understood that the surface modification chamber may comprise a processing chamber selected from the group comprising an electrochemical plating chamber, an electroless deposition chamber, a chemical vapor deposition chamber, a plasma enhanced chemical vapor deposition chamber, an atomic layer deposition chamber, a rinse chamber, an anneal chamber, and combinations thereof. It should also be understood that additional chambers or fewer chambers may be included in the in-line processing system.

The processing chambers 301-307 are generally arranged along a line so that portions of the flexible base 310 can be streamlined through each chamber through feed rolls $309_{1-7}$ and take up rolls $308_{1-7}$ of each chamber. In one embodiment, the feed rolls $309_{1-7}$ and take up rolls $308_{1-7}$ may be activated simultaneously during the substrate transferring step to move each portion of the flexible base 310 one chamber forward. Other details of the plating system are disclosed in commonly assigned U.S. patent application Ser. No. 12/620,788, titled APPARATUS AND METHOD FOR FORMING ELECTRODES OF AN ELECTROCHEMICAL BATTERY AND CAPACITOR, to Lopatin et al., filed Nov. 18, 2009, now published as US 2010/0126849, of which FIGS. 5A-5C, 6A-6E, 7A-7C, and 8A-8D and text corresponding to the aforementioned figures are incorporated by reference.

Figure 3B:
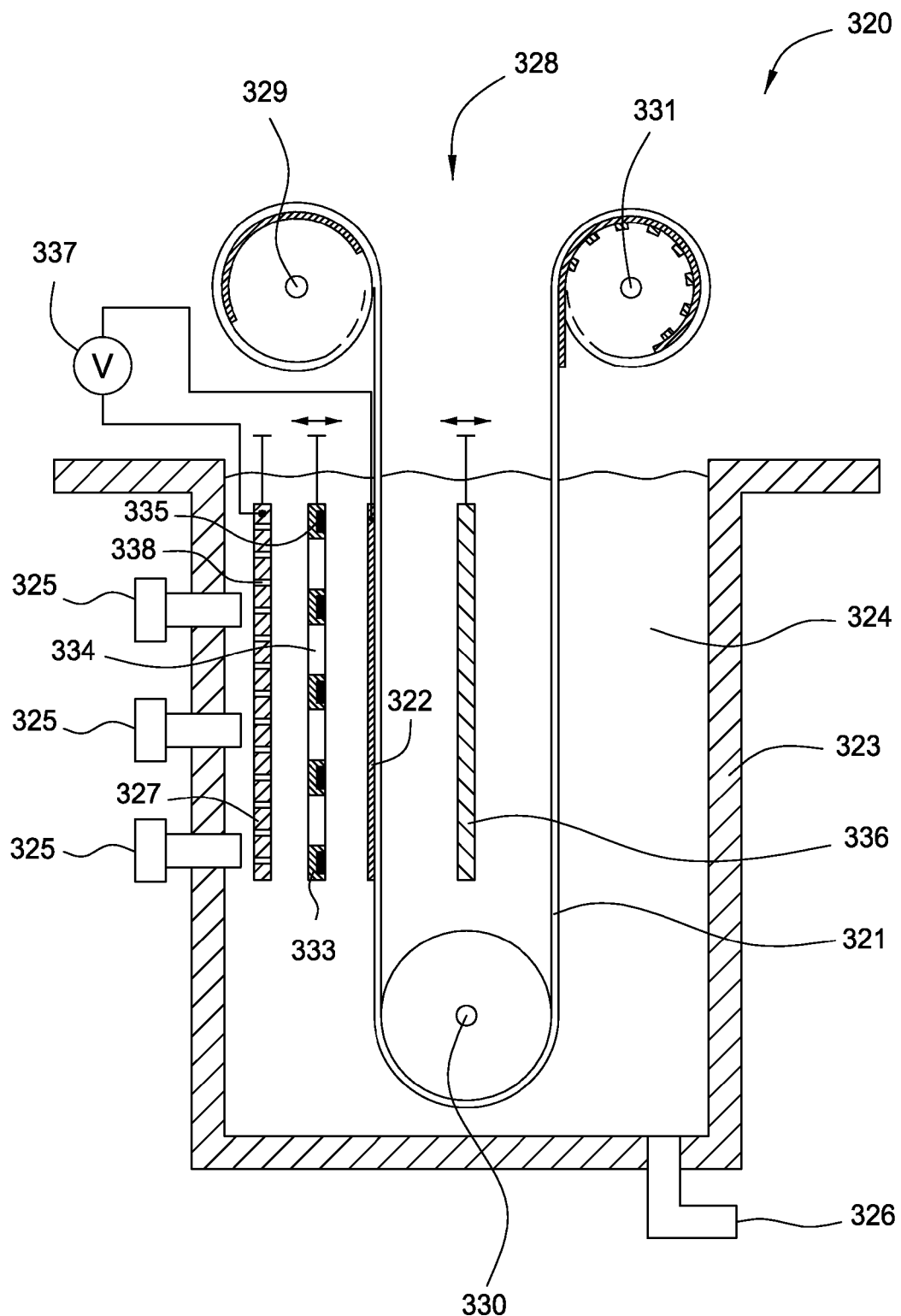
FIG. 3B is a schematic sectional side view of one embodiment of a plating chamber according to embodiments described herein.

FIG. 3B is a schematic sectional side view of one embodiment of a plating chamber 320 according to embodiments described herein. The plating chamber 320 is configured to form a conductive material on a flexible base 321. Similar to the plating chambers 302, 303, 304, and 306 of FIG. 3A, the flexible base 321 is supplied to the plating chamber 320 by portion by portion. Each portion may be considered a substrate. Each substrate is generally cut from the rest of the flexible base 321 after processing.

The plating chamber 320 generally comprises a chamber body 323 defining a processing volume 324. The processing volume 324 is in fluid communication with one or more inlet jet 325 configured to dispense a plating solution in the processing volume 324. The processing volume 324 is also in fluid communication with a drain 326 configured to remove the plating solution from the processing volume 324.

The plating chamber 320 comprises a flexible substrate assembly 328 configured to move the flexible base 321 and to position a particular portion the flexible base 321 in the processing volume 324 to processing. The flexible substrate assembly 328 comprises a feed roll 329 disposed above the processing volume 324, a bottom roll 330 disposed near a bottom portion of the processing volume 324, a take-up roll 331 disposed above the processing volume 324. Each of the feed roll 329, the bottom roll 330, and the take up roll 331 is configured to retain a portion of the flexible base 321. The flexible substrate assembly 328 is configured to feed, position portions of the flexible base 321 within the plating chamber 320 during processing.

In one embodiment, at least the feed roll 329 and the take up roll 331 are coupled to actuators. The feed actuator and take-up actuator are used to position and apply a desired tension to the flexible base 321 so that the electrochemical processes can be performed on thereon. The feed actuator and take-up actuator may be DC servo motor, stepper motor, mechanical spring and brake, or other device that can be used to position and hold the flexible substrate in a desired position with the plating chamber 320.

The plating chamber 320 also comprises an anode assembly 327 disposed in the processing volume 324. In one embodiment, the anode assembly 327 is disposed in a substantially vertical orientation. In one embodiment, the anode assembly 327 may contain a plurality of holes 338 that allow the plating bath passing from the inlet jets 325 to have a uniform flow distributed across a plating surface of the flexible base 321.

The anode assembly 327 may be formed from material that is consumable during the electroplating reaction, but is more preferably formed from a non-consumable material. A non-consumable electrode may be made of a conductive material that is not etched during the formation a metal layer over the flexible base 321, such as platinum or ruthenium coated titanium.

In one embodiment, the plating chamber 320 comprises a masking plate 333 configured to selectively expose regions of the seed layer 322 during processing. The masking plate 333 has a plurality of apertures 334 that preferentially allow the electrochemically deposited material to form therein. In one embodiment, the masking plate 333 may define a pattern configured for a light-receiving side of the flexible solar cell.

In one embodiment, the plating chamber 320 comprises a thrust plate 336 disposed in the processing volume 324, substantially parallel to the anode assembly 327. The thrust plate 336 is configured to hold a portion of the flexible base 321 in a position relative to the anode assembly 327 during the electrochemical deposition process. The thrust plate 336 is positioned on a backside of the flexible base 321 and the anode assembly 327 and masking plate 333 are positioned on a front side of the flexible base 321.

In one embodiment, the thrust plate 336 is horizontally movable. During transferring stage, the thrust plate 336 is moved away from the flexible base 321 and neither the masking plate 333 nor the thrust plate 336 is in contact with the flexible base 321. Before processing, at least one of the thrust plate 336 and the masking plate 333 is moved towards the other sandwiching the flexible base 321 in between. The thrust plate 336 ensures that the flexible base 321 is substantially parallel to the anode assembly 327 and in a desired distance from the anode assembly 327.

A power source 337 is coupled between the anode assembly 327 and the masking plate 333 to provide electric bias for a plating process. In one embodiment, a plurality of electrical contacts 335 is formed on a surface of the masking plate 333. The power source 337 is coupled to the plurality of electrical contacts 335 which then provides electrical bias to the seed layer 322 when the masking plate 333 contacts the flexible base 321. The plurality of electrical contacts 335 may be formed from separate and discrete conductive contacts that are nested within a recess formed in the masking plate 333 when the flexible base 321 is being urged against the masking plate 333. The electrical contacts 335 may be formed from a metal, such as platinum, gold, or nickel, or another conductive material, such as graphite, copper Cu, phosphorous doped copper (CuP), and platinum coated titanium (Pt/Ti).

Figure 4:
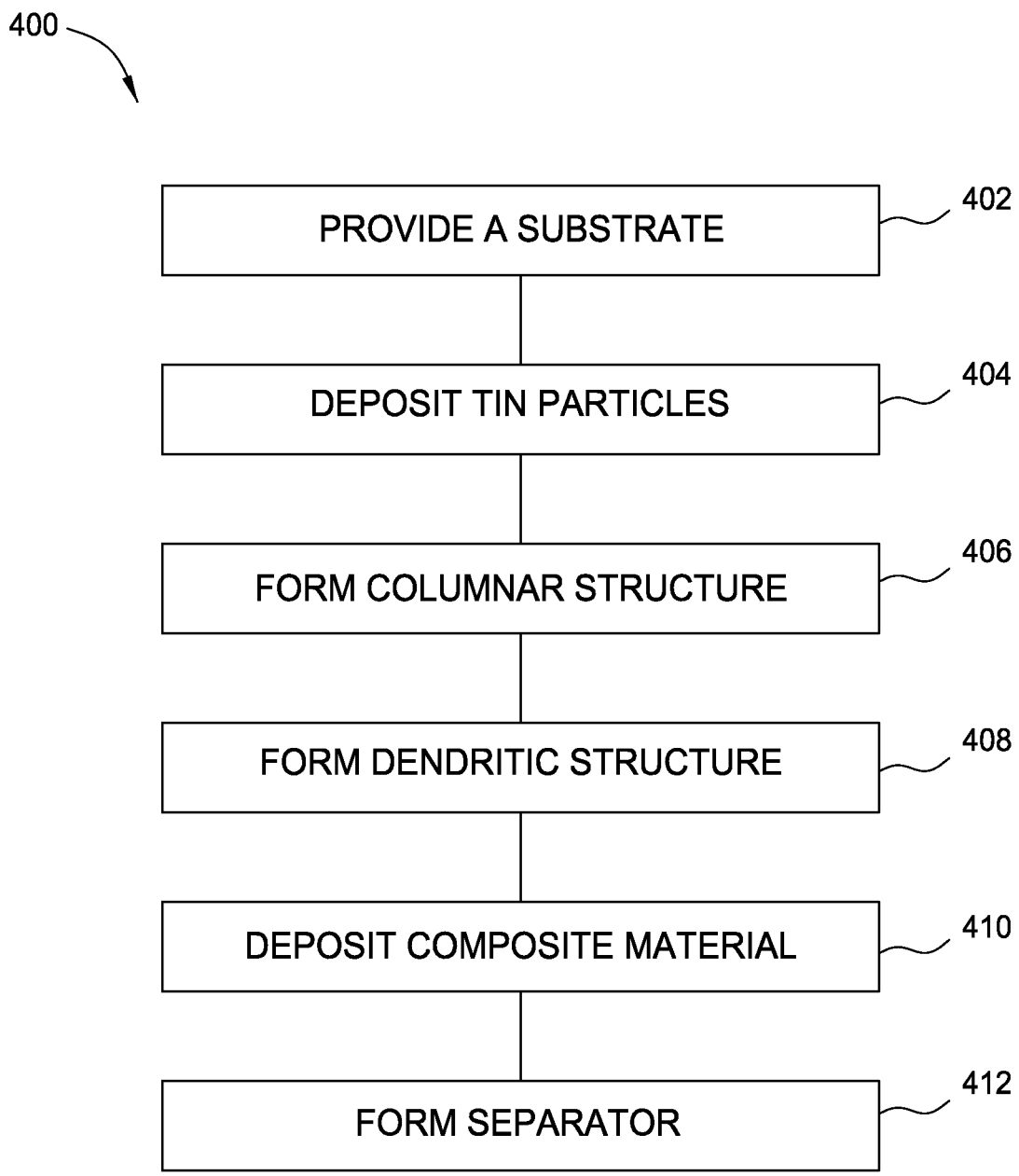
FIG. 4 is a process flow chart summarizing one embodiment of a method for forming an anode structure according to embodiments described herein.

FIG. 4 is a process flow chart summarizing one embodiment of a method 400 for forming an anode structure similar to anode structure 102 as illustrated in FIGS. 1 and 2A-2F, according to embodiments described herein. In block 402, a substrate substantially similar to current collector 111 in FIG. 1 is provided. As detailed above, the substrate may be a conductive substrate, such as metallic foil, or a non-conductive substrate that has an electrically conductive layer formed thereon, such as a flexible polymer or plastic having a metallic coating.

In block 404, tin particles similar to tin particles 202 are deposited over the current collector 111.

In block 406, columnar projections similar to conductive columnar projections 206 in FIG. 2C is formed on a conductive surface of the current collector 111. In one embodiment, the columnar projections 206 may have a height of 5 to 10 microns and/or have a measured surface roughness of about 10 microns. In another embodiment, the columnar projections 206 may have a height of 15 to 30 microns and/or have a measured surface roughness of about 20 microns. In one embodiment, a diffusion-limited electrochemical plating process is used to form the columnar projections 206. In one embodiment, the three dimensional growth of the columnar projections 206 is performed using a high plating rate electroplating process performed at current densities above the limiting current ($i_L$). Formation of the columnar projections 206 includes establishing process conditions under which evolution of hydrogen results, thereby forming a porous metal film. In one embodiment, such process conditions are achieved by performing at least one of: decreasing the concentration of metal ions near the surface of the plating process; increasing the diffusion boundary layer; and reducing the organic additive concentration in the electrolyte bath. It should be noted that the diffusion boundary layer is strongly related to the hydrodynamic conditions. If the metal ion concentration is too low and/or the diffusion boundary layer is too large at a desired plating rate, the limiting current ($i_L$) will be reached. The diffusion-limited plating process created when the limiting current is reached forms the increase in plating rate by the application of more voltage to the surface of the plating process, e.g., a seed layer surface on current collector 111. When the limiting current is reached, low density columnar projections, i.e., columnar projections 206, are produced due to the evolution of gas and resulting dendritic type film growth that occurs due to the mass-transport-limited process.

Formation of columnar projections 206 may take place in a processing chamber. A processing chamber that may be adapted to perform one or more of the process steps described herein may include an electroplating chamber, such as the SLIMCELL® electroplating chamber available from Applied Materials, Inc. of Santa Clara, Calif. A preferred approach for forming columnar projections 206 is roll-to-roll plating using the processing system 300 described above. Other processing chambers and systems, including those available from other manufactures may also be used to practice the embodiments described herein.

The processing chamber includes a suitable plating solution. Suitable plating solutions that may be used with the processes described herein include electrolyte solutions containing a metal ion source, an acid solution, and optional additives. Suitable plating solutions are described in commonly assigned U.S. patent application Ser. No. 12/696,422, entitled, "Porous Three Dimensional Copper, Tin, Copper-Tin, Copper-Tin-Cobalt, And Copper-Tin-Cobalt-Titanium Electrodes For Batteries And Ultra Capacitors," filed on Jan. 29, 2010, to Lopatin et al., now published as US 2010/0193365, which is herein incorporated by reference to the extent not inconsistent with the invention.

The columnar projections 206 are formed using a diffusion limited deposition process. The current densities of the deposition bias are selected such that the current densities are above the limiting current ($i_L$). The columnar metal film is formed due to the evolution of hydrogen gas and resulting dendritic film growth that occurs due to the mass transport limited process. In one embodiment, during formation of columnar projections 206, the deposition bias generally has a current density of about 10 A/cm$^2$ or less. In another embodiment, during formation of columnar projections 206, the deposition bias generally has a current density of about 5 A/cm$^2$ or less. In yet another embodiment, during formation of columnar projections 206, the deposition bias generally has a current density of about 3 A/cm$^2$ or less. In one embodiment, the deposition bias has a current density in the range from about 0.05 A/cm$^2$ to about 3.0 A/cm$^2$. In another embodiment, the deposition bias has a current density between about 0.1 A/cm$^2$ and about 0.5 A/cm$^2$. In yet another embodiment, the deposition bias has a current density between about 0.05 A/cm$^2$ and about 0.3 A/cm$^2$. In yet another embodiment, the deposition bias has a current density between about 0.05 A/cm$^2$ and about 0.2 A/cm$^2$. In one embodiment, this results in the formation of columnar projections between about 1 micron and about 300 microns thick on the copper seed layer. In another embodiment, this results in the formation of columnar projections between about 10 microns and about 30 microns. In yet another embodiment, this results in the formation of columnar projections between about 30 microns and about 100 microns. In yet another embodiment, this results in the formation of columnar projections between about 1 micron and about 10 microns, for example, about 5 microns.

In block 408, conductive dendritic structures substantially similar to dendritic structures 208 in FIGS. 2D-F are formed on the substrate or current collector 111. The conductive dendritic structures may be formed on the columnar projections of block 406, or formed directly on the flat conductive surface of the substrate or current collector 111. In one embodiment, an electrochemical plating process may be used to form the conductive dendritic structures, and in another embodiment, an electroless plating process may be used.

The electrochemical plating process for forming conductive dendritic structures similar to dendritic structures 208 involves exceeding the electro-plating limiting current during plating to produce an even lower-density dendritic structure than columnar projections 206 formed at block 406. Otherwise, the process is substantially similar to the electroplating process of block 406 and may be performed in-situ, and thus may be performed immediately following block 406 in the same chamber. The electric potential spike at the cathode during this step is generally large enough so that reduction reactions occur, hydrogen gas bubbles form as a byproduct of the reduction reactions at the cathode, while dendritic structures are constantly being formed on the exposed surfaces. The formed dendrites grow around the formed hydrogen bubbles because there is no electrolyte-electrode contact underneath the bubble. In a way, these microscopic bubbles serve as "templates" for dendritic growth. Consequently, these anodes have many pores when deposited according to embodiments described herein.

In one embodiment, minimizing the size of evolved gas bubbles produces smaller pores in dendritic structures 208. As the bubbles rise, they may combine, or coalesce, with nearby bubbles to form larger dendrite templates. The artifacts remaining from this entire process are relatively large pores in the dendritic growth. In order to maximize surface area of dendritic structures 208, it is preferable to minimize the size of such pores. This can be achieved with the addition of organic additives, such as organic acids.

In sum, when an electrochemical plating process is used to form dendritic structures 208 on columnar projections 206, a columnar microstructure may be formed at a first current density by a diffusion limited deposition process, followed by the three dimensional growth of dendritic structures 208 at a second current density, or second applied voltage, that is greater than the first current density, or first applied voltage.

Alternatively, an electroless deposition process may be used to form dendritic structures 208. In such an embodiment, dendritic structures 208 are comprised of chains of catalytic metal nano-particles. Metal nano-particles known to act as catalysts for forming carbon nano-tubes include iron (Fe), palladium (Pd), platinum (Pt) and silver (Ag), and embodiments of the invention contemplate that the catalytic nano-particles that form dendritic structures 208 may include such catalytic materials. According to one embodiment, the electroless deposition process is achieved by immersing the substrate in a silver nitrate ($AgNO_3$) solution or other silver salt solution.

In block 410, an optional composite material similar to optional composite material 114 in FIG. 2F is formed over the substrate or current collector 111. In one embodiment, the composite material is deposited in the pores of the dendritic structure to form a hybrid layer prior to formation of the separator layer. In one embodiment, the composite material is a graphitic material. Graphite is usually used as the active electrode material of the negative electrode and can be in the form of a lithium-intercalation meso carbon micro beads (MCMB) powder made up of MCMBs having a diameter of approximately 10 μm. The lithium-intercalation MCMB powder is dispersed in a polymeric binder matrix. The polymers for the binder matrix are made of thermoplastic polymers including polymers with rubber elasticity. The polymeric binder serves to bind together the MCMB material powders to preclude crack formation and prevent disintegration of the MCMB powder on the surface of the current collector. In one embodiment, the quantity of polymeric binder is in the range of 2% to 30% by weight.

In certain embodiments, the graphitic material or mesoporous structure may be formed prior to the formation of the passivation film.

In block 412, a separator layer is formed. In one embodiment, the separator layer is a dielectric, porous, fluid-permeable layer that prevents direct electrical contact between the components in the anode structure and the cathode structure. Alternatively, the separator layer is deposited onto the surface of the dendritic structure and may be a solid polymer, such as polyolefin, polypropylene, polyethylene, and combinations thereof. In one embodiment, the separator layer comprises a polymerized carbon layer comprising a densified layer of mesoporous carbon material on which a dielectric layer may be deposited or attached.

Figure 5:
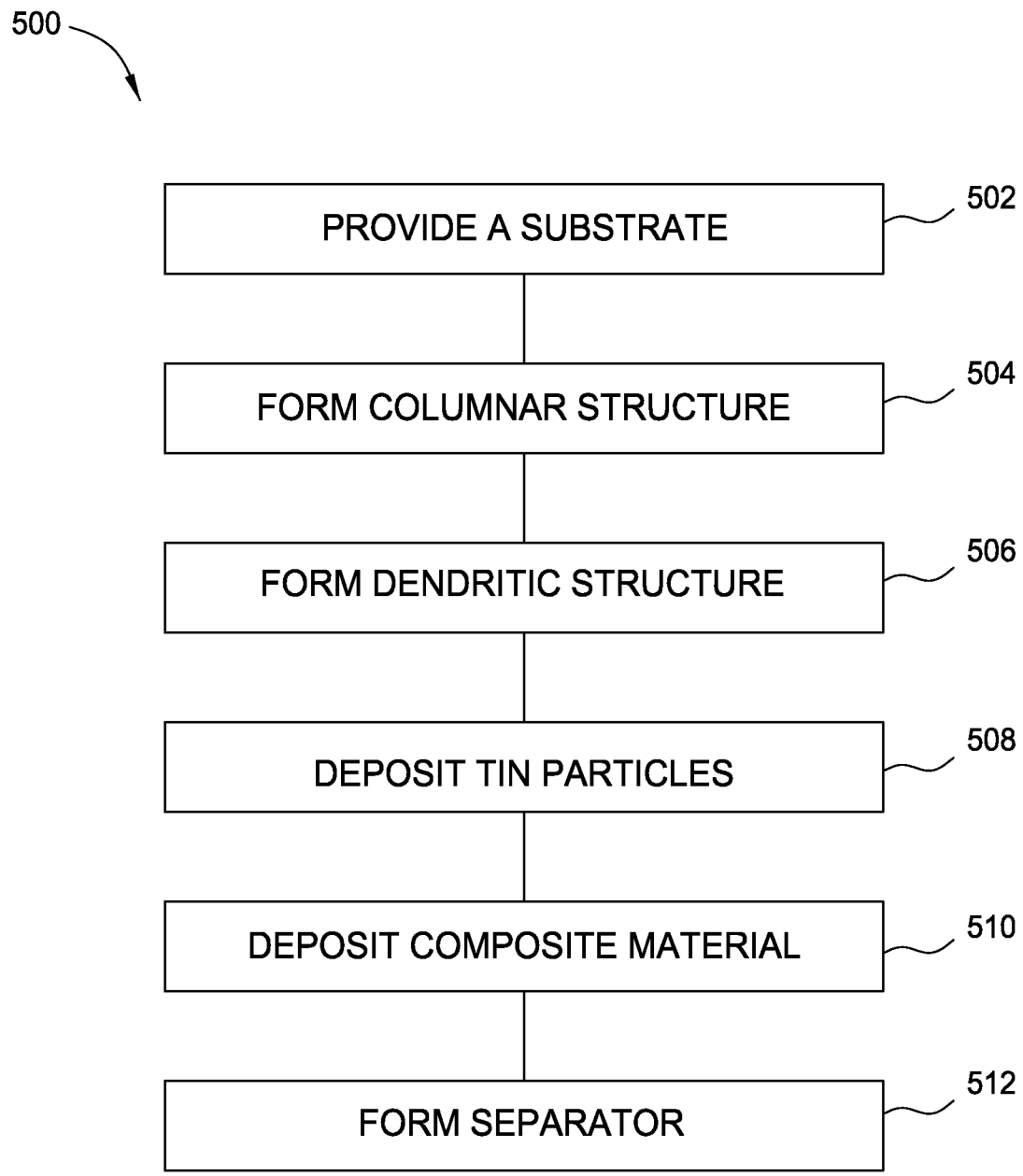
FIG. 5 is a process flow chart summarizing one embodiment of a method for forming an anode structure according to embodiments described herein.

FIG. 5 is a process flow chart summarizing one embodiment of a method 500 for forming an anode structure according to embodiments described herein. A substrate is provided in block 502. Columnar projections are formed in block 504. A dendritic structure is formed in block 506. Tin particles are formed in block 508. An optional composite material may be formed in block 510. A separator may be formed in block 512. The method 500 is substantially similar to the method 400 described above in blocks 402-412 except tin particles similar to tin particles 210 in FIGS. 2E and 2F are deposited in block 508 after formation of the dendritic structure in block 506 and prior to deposition of the optional composite material in block 510.

FIG. 6 is a process flow chart summarizing one embodiment of a method 600 for forming an anode structure according to embodiments described herein. A substrate is provided in block 602. Columnar projections are formed in block 604. A copper-tin dendritic structure is formed in block 606. Tin particles are formed in block 608. An optional composite material may be formed in block 610. A separator may be formed in block 612. The method 600 is substantially similar to the method 500 described in blocks 502-512 of FIG. 5 except that tin particles similar to tin particles 210 in FIGS. 2E and 2F are deposited in block 608 over a copper-tin dendritic structure formed in block 606.

Figure 7:
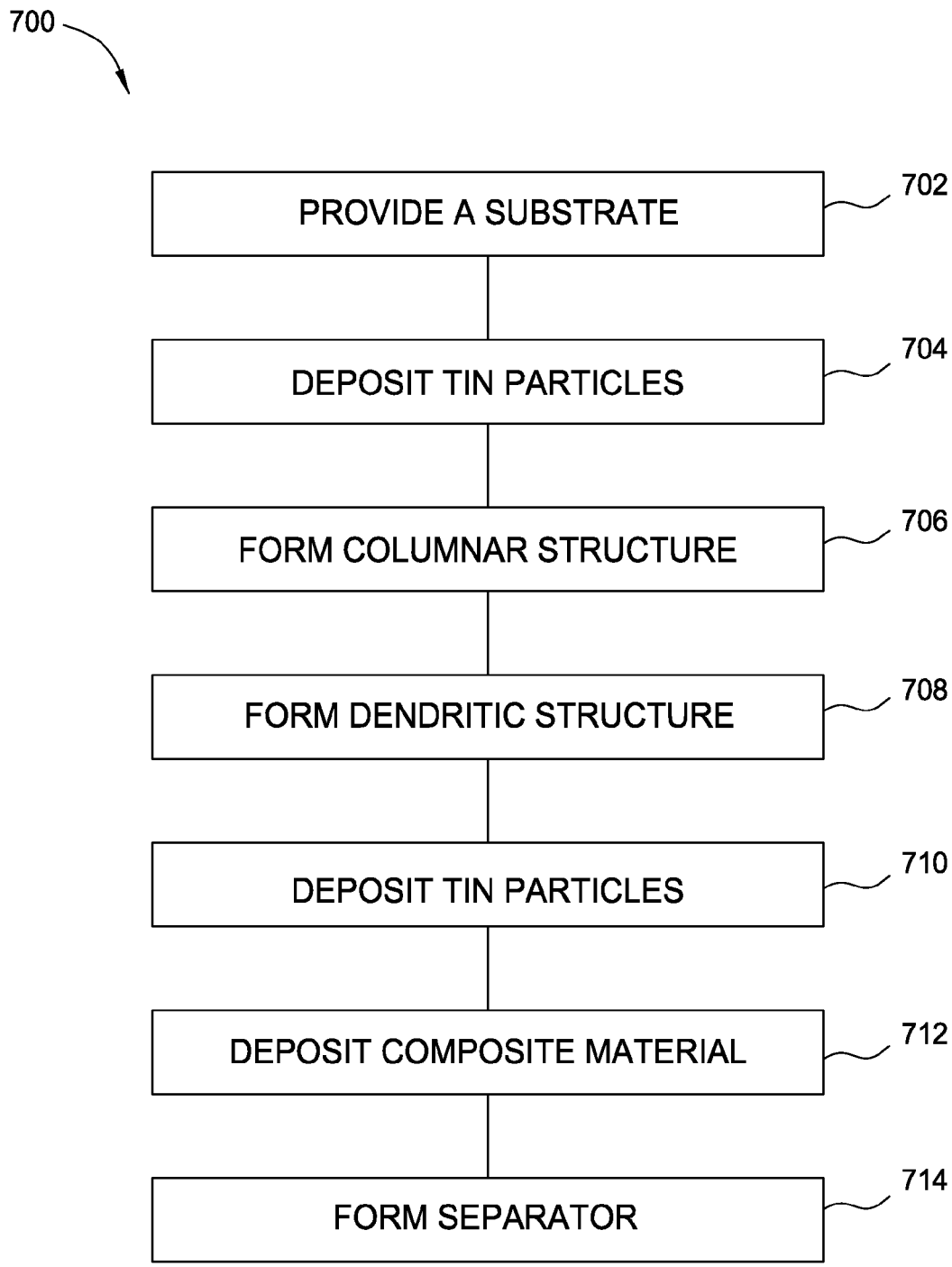
FIG. 7 is a process flow chart summarizing one embodiment of a method for forming an anode structure according to embodiments described herein.

FIG. 7 is a process flow chart summarizing one embodiment of a method 700 for forming an anode structure according to embodiments described herein. A substrate is provided in block 702. Tin particles are formed in block 704. Columnar projections are formed in block 706. A dendritic structure is formed in block 708. Tin particles are formed in block 710. An optional composite material may be formed in block 712. A separator may be formed in block 714. The method 700 is substantially similar to the method 400 described in blocks 402-412 and the method 500 described in blocks 502-512 except that in block 704 tin particles 202 are deposited over the substrate provided in block 702 prior to formation the columnar structure in block 706 and in block 710, tin particles are deposited over the dendritic structure formed in block 708 and prior to deposition of the optional composite material in block 712.

Figure 8:
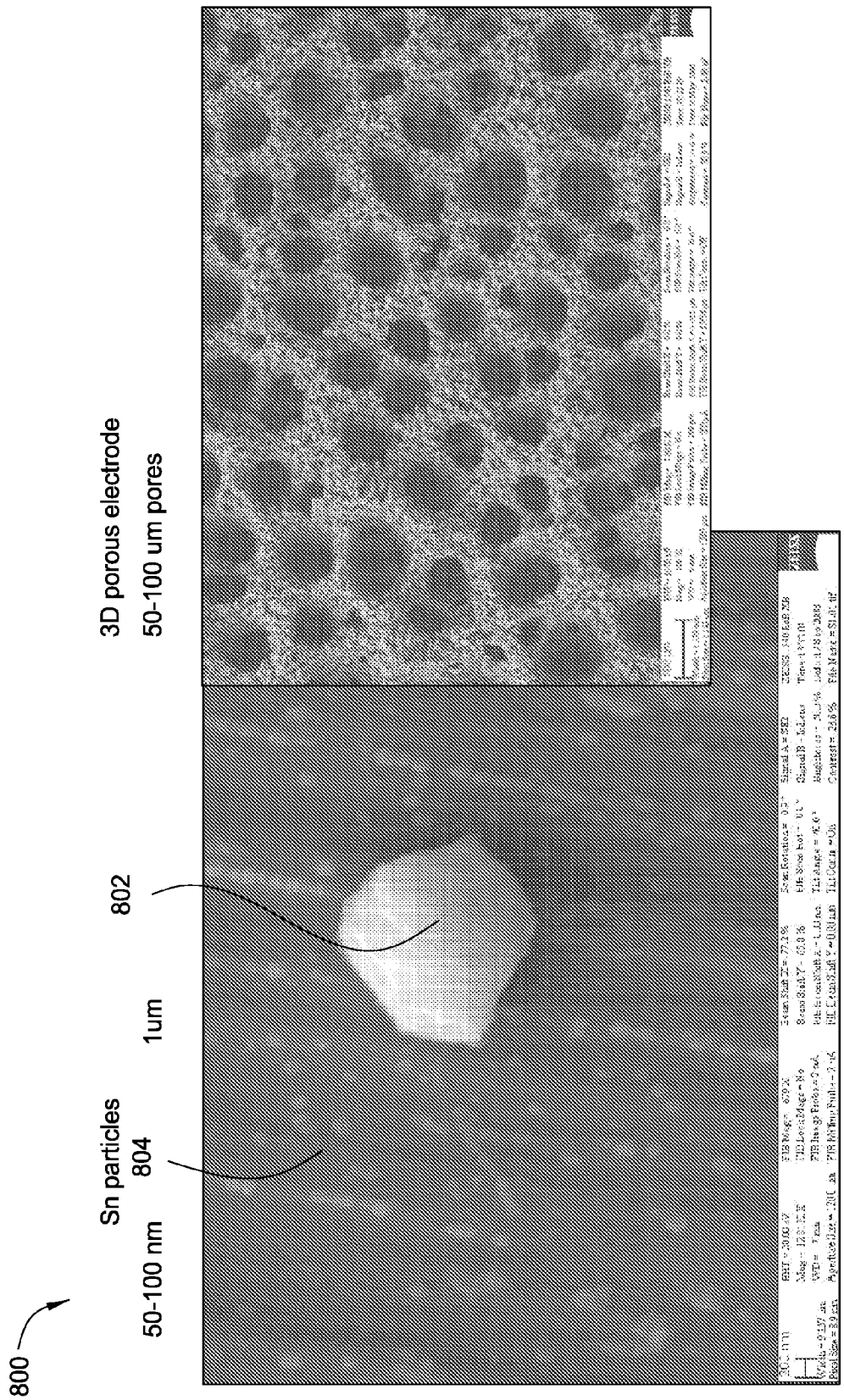
FIG. 8 is a representation of a scanning electron microscope (SEM) image of tin particles deposited on a copper foil substrate.

FIG. 8 is a representation of a scanning electron microscope (SEM) image 800 of tin particles deposited on a copper foil substrate. The large tin particle 802 shown has a particle size of approximately 1 μm. The small tin particles 804 shown have a particle size of between 50-100 nm.

FIG. 9A is a schematic representation of a scanning electron microscope (SEM) image 902 of tin particles deposited on a copper foil substrate at a magnification of 500×. FIG. 9B is a schematic representation of a scanning electron microscope (SEM) image 904 of tin particles deposited on a copper foil substrate at a magnification of 200×. The tin particles depicted in FIG. 9A and 9B were plated at about 2 volts at a medium current density of about 0.2 A/cm².

FIGS. 10A-10D are schematic representations of a scanning electron microscope (SEM) image of tin particles deposited at varying voltages on a copper foil substrate at a magnification of 200×. The SEM image 1000 of FIG. 10A shows tin particles formed at a voltage of 1.2 volts. The SEM image 1002 of FIG. 10B shows tin particles formed at a voltage of 1.4 volts. The SEM image 1004 of FIG. 10C shows tin particles formed at a voltage of 1.8 volts. The SEM image 1006 of FIG. 10D shows tin particles formed at a voltage of 2.0 volts. As shown in FIG. 10A-10D the density and size of the tin particles increases with voltage.

FIGS. 11A-11D are schematic representations of a scanning electron microscope (SEM) image of tin particles deposited at varying voltages on a copper foil substrate at a magnification of 500×. The SEM image 1100 of FIG. 11A shows tin particles formed at a voltage of 1.2 volts. The SEM image 1102 of FIG. 11B shows tin particles formed at a voltage of 1.4 volts. The SEM image 1104 of FIG. 11C shows tin particles formed at a voltage of 1.8 volts. The SEM image 1106 of FIG. 11D shows tin particles formed at a voltage of 2.0 volts. As shown in FIG. 11A-11D the density and size of the tin particles increases with voltage.

Figure 12:
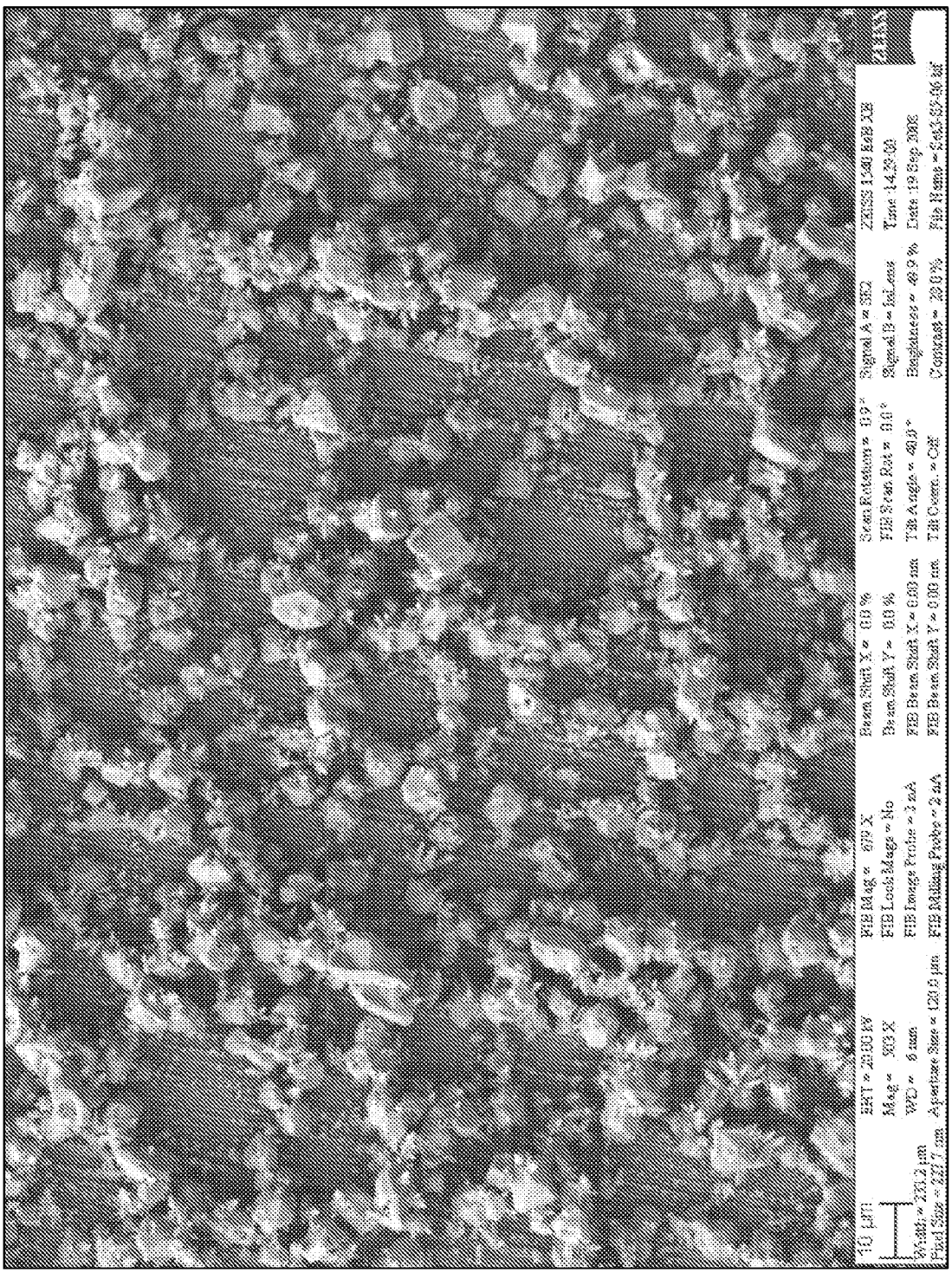
FIG. 12 is a schematic representation of a scanning electron microscope (SEM) image of tin particles deposited over a copper microstructure at a magnification of 503×.
Figure 13B:
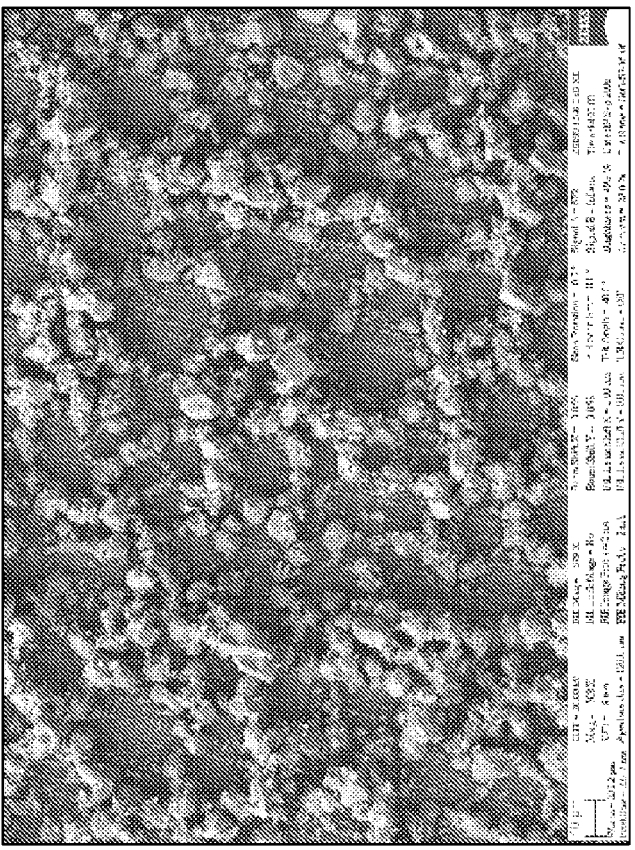
FIG. 13B is a schematic representation of a scanning electron microscope (SEM) image of tin particles deposited over a copper microstructure at a magnification of 503×.
Figure 13A:
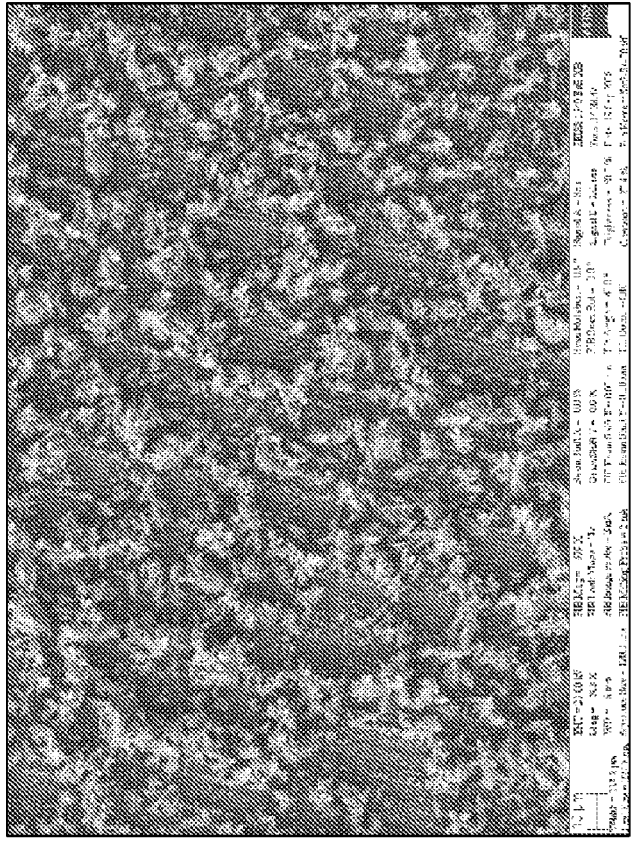
FIG. 13A is a schematic representation of a scanning electron microscope (SEM) image of tin particles deposited over a copper microstructure at a magnification of 503×.

FIG. 12 is a schematic representation of a scanning electron microscope (SEM) image 1200 of tin particles deposited over a copper microstructure at a magnification of 503×. The tin particles form a pattern in the three dimensional copper microstructure;

FIG. 13A is a schematic representation of a scanning electron microscope (SEM) image 1300 of tin particles deposited over a copper microstructure at a magnification of 503×. The SEM image 1300 shows the formation of tin nano-particles on a copper microstructure after copper dendrites have been formed.

FIG. 13B is a schematic representation of a scanning electron microscope (SEM) image 1310 of tin particles deposited over a copper microstructure at a magnification of 503×. The SEM image 1310 shows the formation of tin micro-particles on a copper microstructure after copper dendrites have been formed.

Figure 14B:
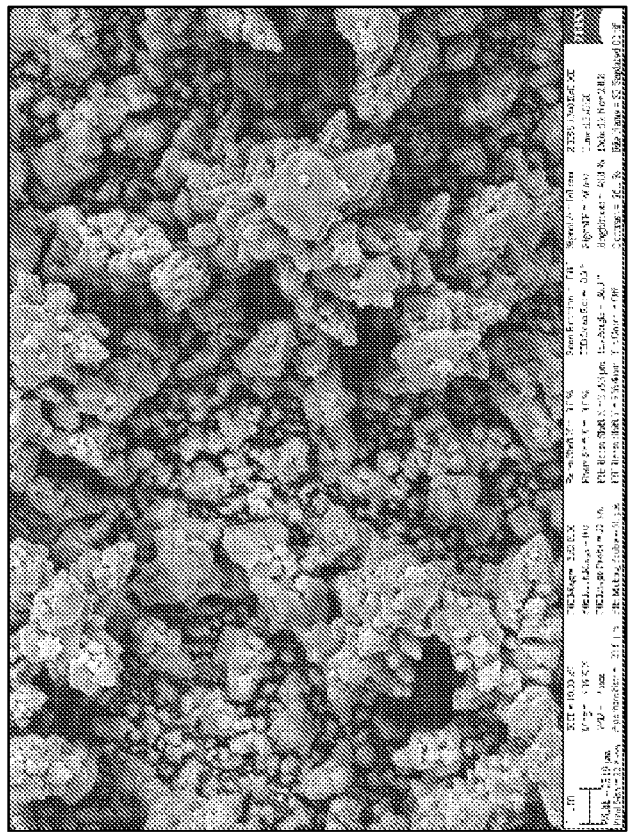
FIG. 14B is a schematic representation of a scanning electron microscope (SEM) image of a copper microstructure after the deposition of tin particles; at a magnification of 5.06 K ×.
Figure 14A:
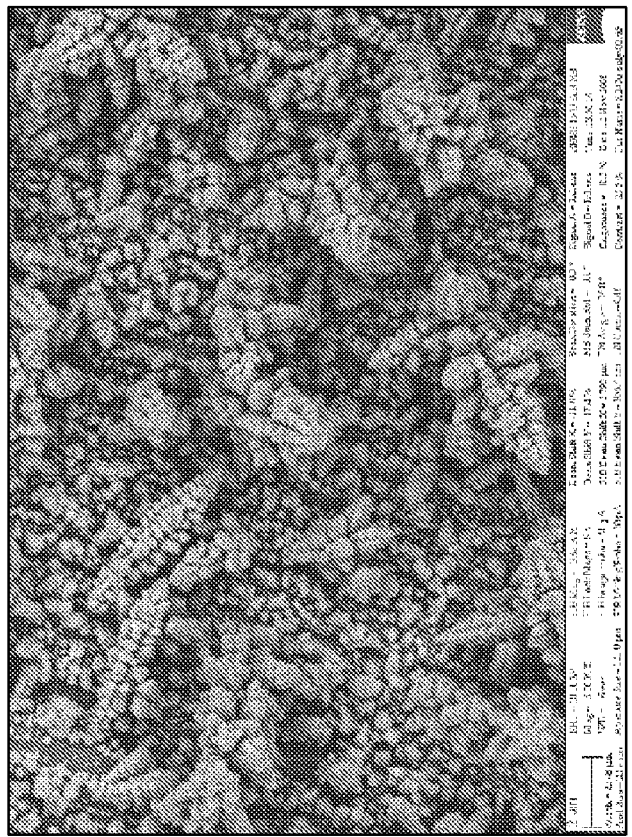
FIG. 14A is a schematic representation of a scanning electron microscope (SEM) image of a copper microstructure prior to the deposition of tin particles at a magnification of 5.00 K ×.

FIG. 14A is a schematic representation of a scanning electron microscope (SEM) image 1400 of a copper microstructure prior to the deposition of tin particles at a magnification of 5.00 K ×. FIG. 14B is a schematic representation of a scanning electron microscope (SEM) image 1402 of a copper microstructure after the plating of tin nano-particles; at a magnification of 5.06 K ×.

Figure 15A:
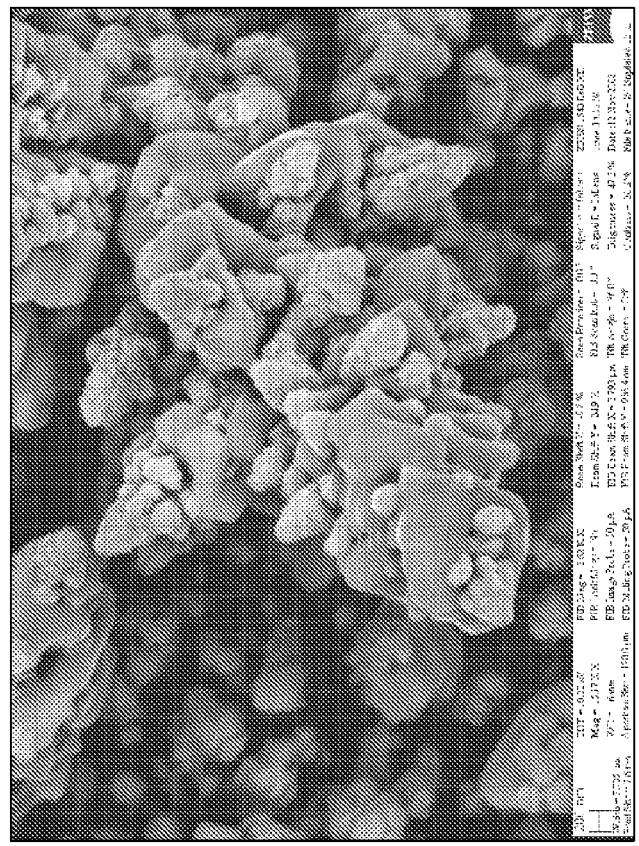
FIG. 15A is a schematic representation of a scanning electron microscope (SEM) image of a copper microstructure prior to the deposition of tin particles at a magnification of 15.17 K ×.
Figure 15B:
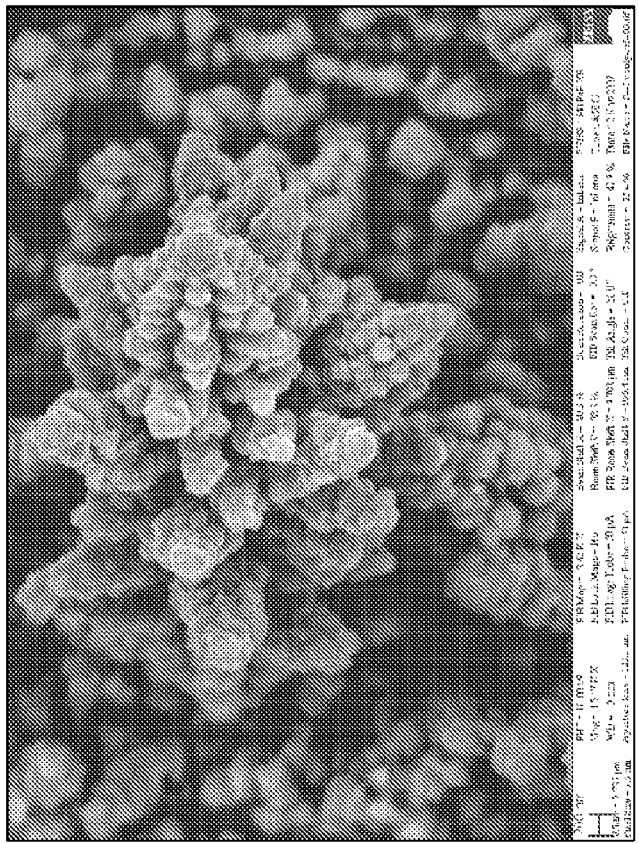
FIG. 15B is a schematic representation of a scanning electron microscope (SEM) image of a copper microstructure after the deposition of tin particles; at a magnification of 15.17 K ×.

FIG. 15A is a schematic representation of a scanning electron microscope (SEM) image 1500 of a copper microstructure prior to the deposition of tin particles at a magnification of 15.17 K ×. FIG. 15B is a schematic representation of a scanning electron microscope (SEM) image 1510 of a copper microstructure after the plating of tin nano-particles around nano-copper trees; at a magnification of 15.17 K ×.

Figure 16:
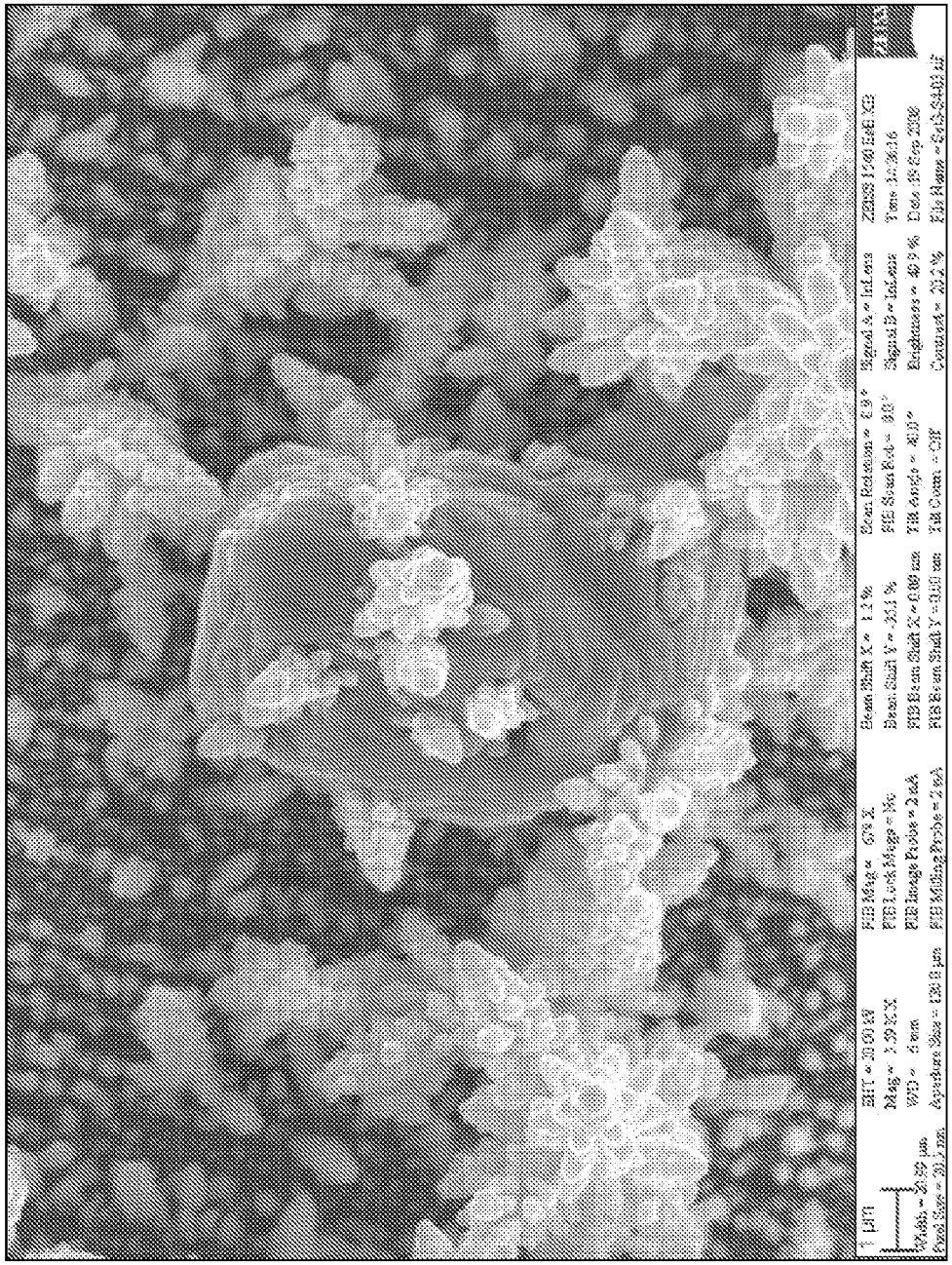
FIG. 16 is a schematic representation of a scanning electron microscope (SEM) image of tin particles deposited over a copper microstructure at a magnification of 5.59 K ×.

FIG. 16 is a schematic representation of a scanning electron microscope (SEM) image 1600 of tin particles embedded in a copper microstructure at a magnification of 5.59 K ×. FIG. 16 depicts a tin particle of approximately 1 micron embedded in a copper microstructure around a copper tree.

Figure 17:
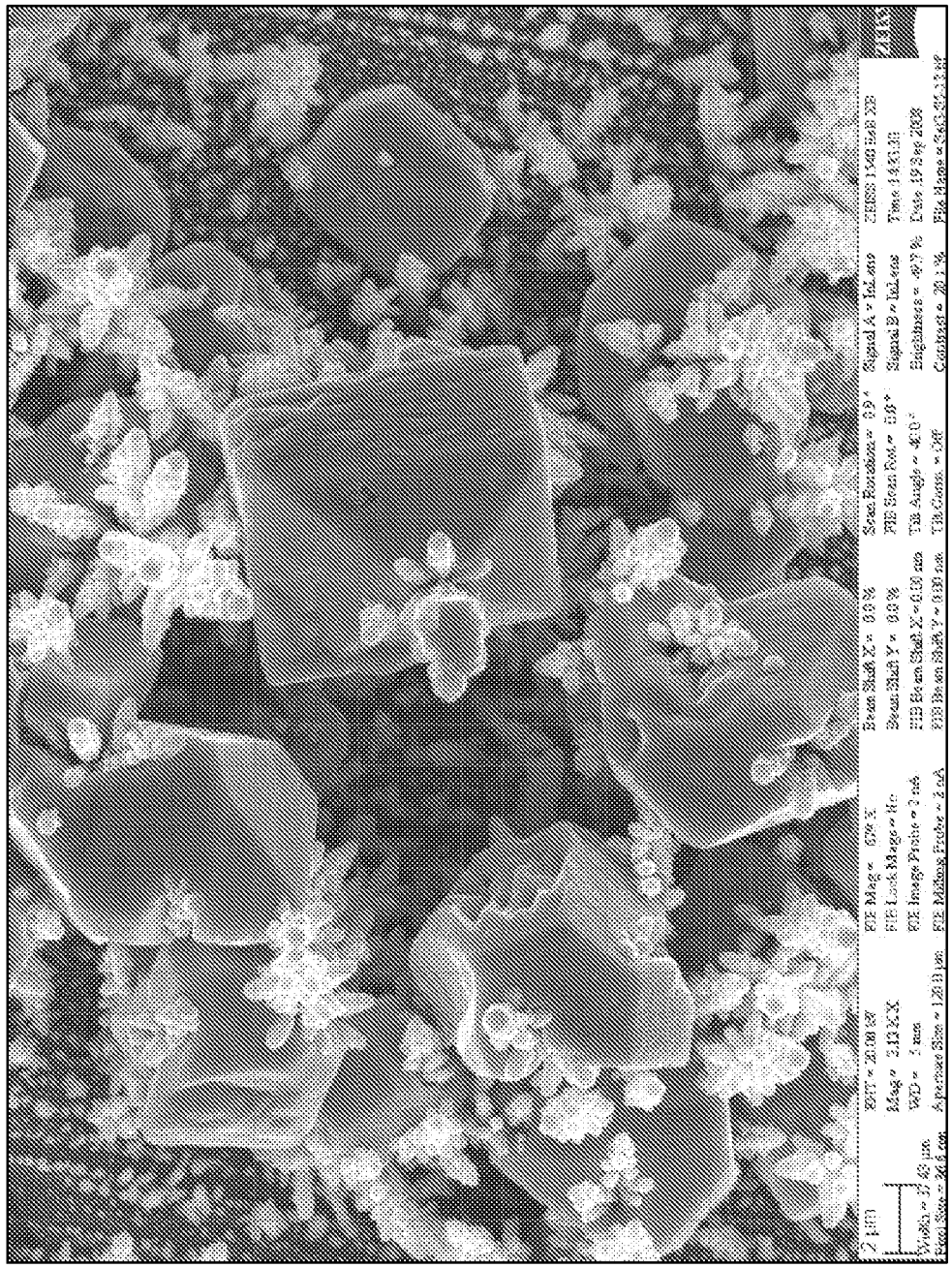
FIG. 17 is a schematic representation of a scanning electron microscope (SEM) image of tin particles deposited over a copper microstructure at a magnification of 3.13 K ×.

FIG. 17 is a schematic representation of a scanning electron microscope (SEM) image 1700 of large tin particles formed around a copper microstructure at a magnification of 3.13 K ×. The large tin particles have a particle size of between about 3 microns and about 4 microns.

Figure 18:
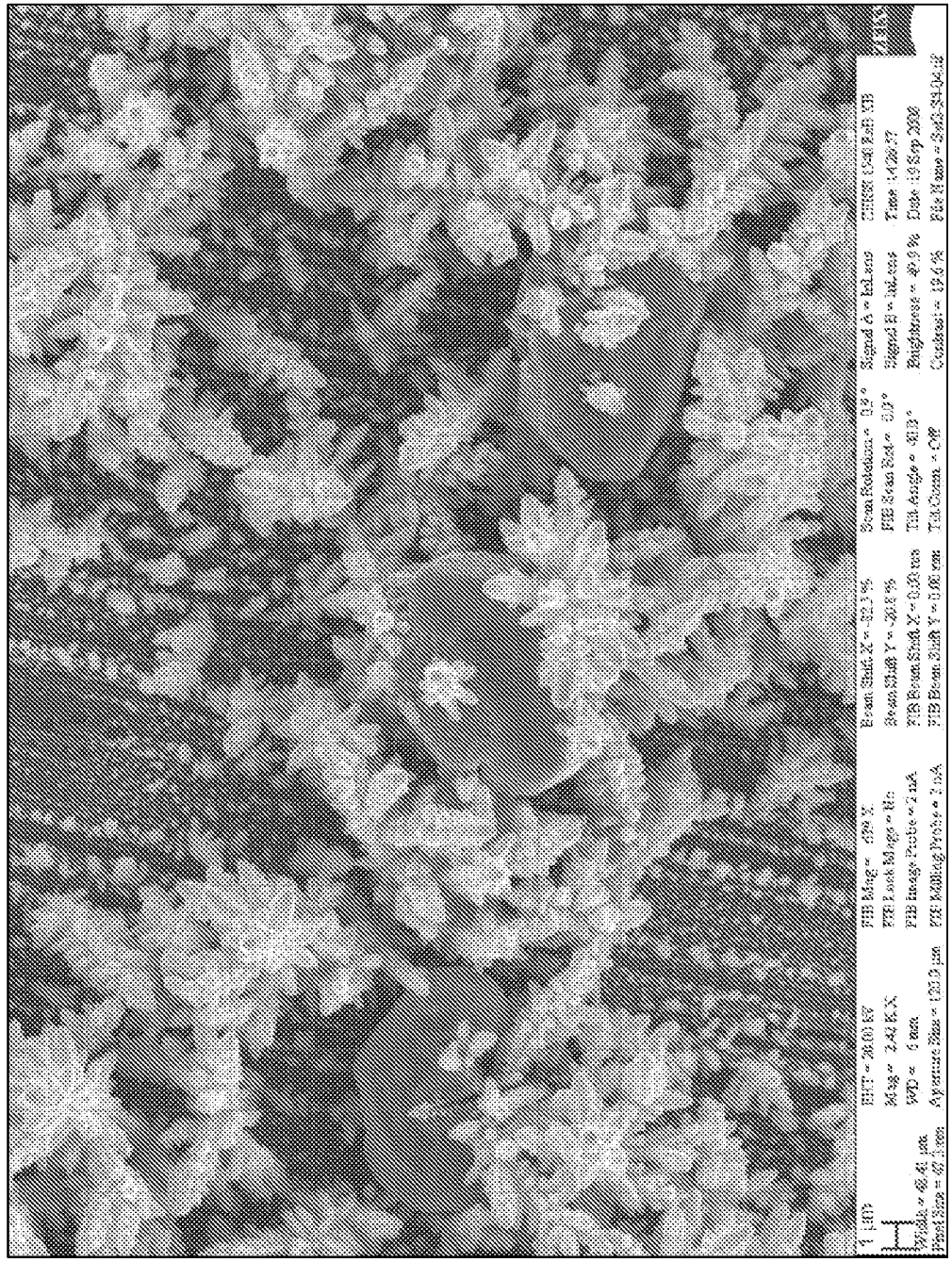
FIG. 18 is a schematic representation of a scanning electron microscope (SEM) image of tin particles embedded in a copper microstructure at a magnification of 2.42 K ×.

FIG. 18 is a schematic representation of a scanning electron microscope (SEM) image 1800 of large tin particles embedded in a copper microstructure at a magnification of 2.42 K ×.

Figure 19B:
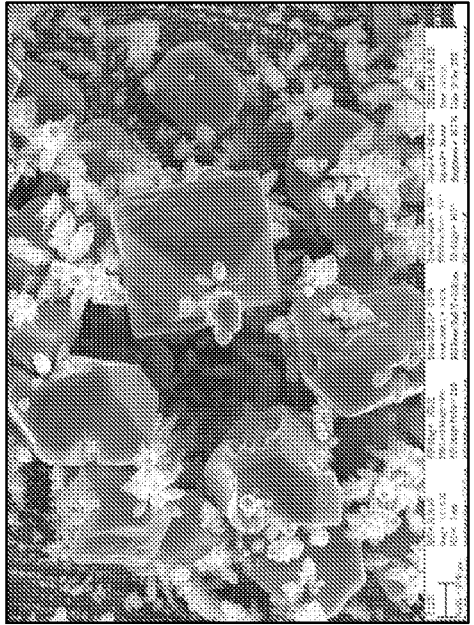
FIGS. 19A-19D are schematic representations of a scanning electron microscope (SEM) image of tin particles deposited in the middle of a copper microstructure at various magnifications.
Figure 19D:
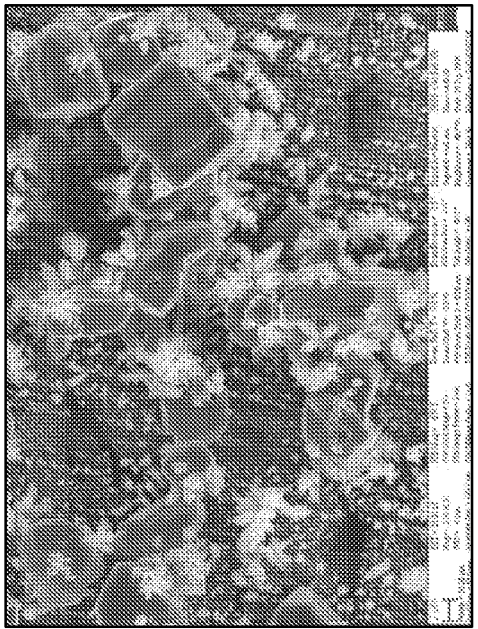
Figure 19A:
Figure 19C:

FIG. 19A is a schematic representation of a scanning electron microscope (SEM) image 1900 of tin particles deposited in the middle of a copper microstructure at a magnification of about 3 K ×. FIG. 19B is a schematic representation of a scanning electron microscope (SEM) image 1910 of tin particles deposited in the middle of a copper microstructure at a magnification of about 3 K ×. FIG. 19C is a schematic representation of a scanning electron microscope (SEM) image 1920 of tin particles deposited in the middle of a copper microstructure at a magnification of about 3 K ×. FIG. 19D is a schematic representation of a scanning electron microscope (SEM) image 1930 of tin particles deposited in the middle of a copper microstructure at a magnification of about 2 K ×.

Figure 20:
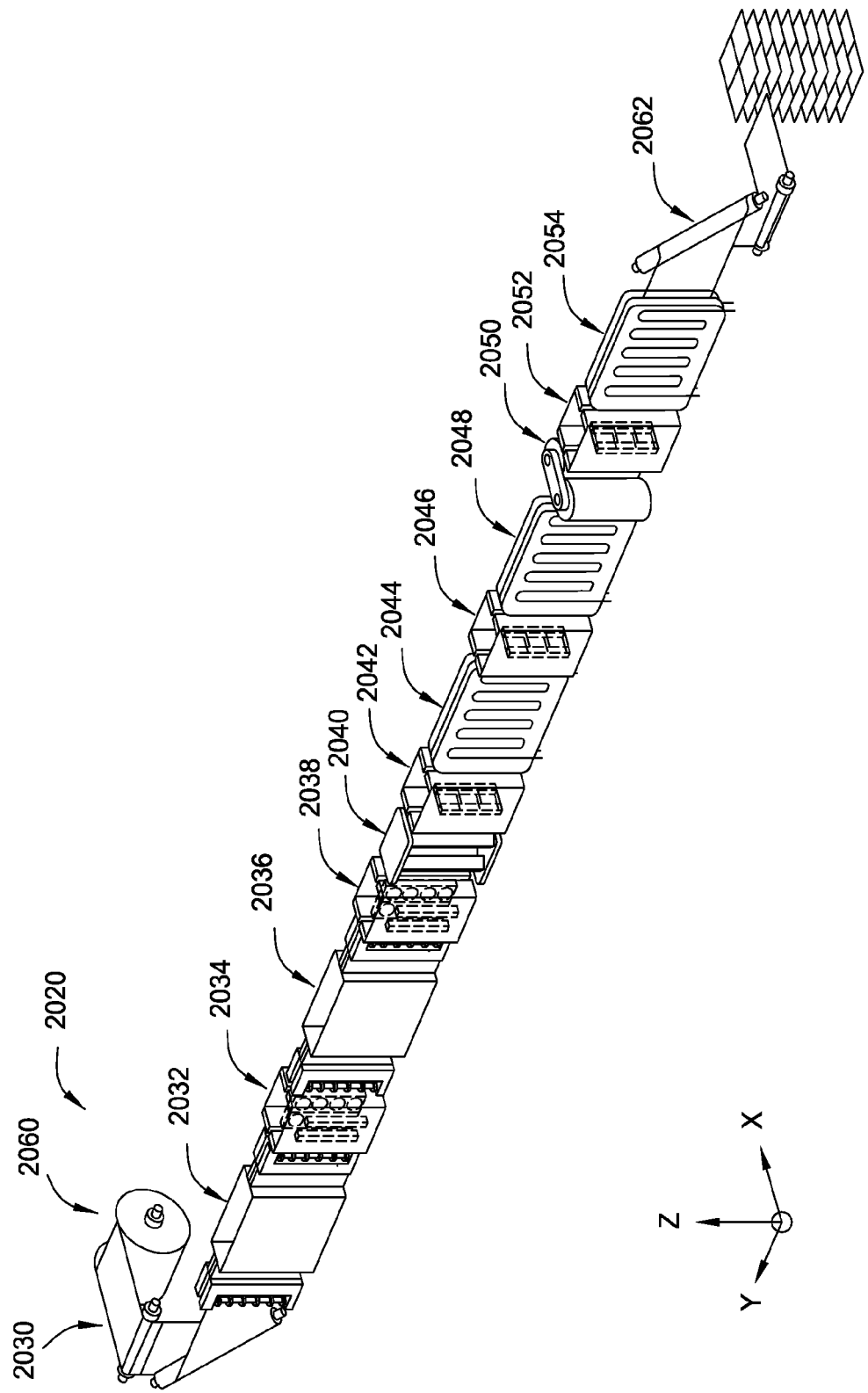
FIG. 20 schematically illustrates one embodiment of a vertical processing system according to embodiments described herein.

FIG. 20 schematically illustrates one embodiment of a vertical processing system 2020 according to embodiments described herein. The processing system 2020 generally comprises a plurality of processing chambers 2032-2054 arranged in a line, each configured to perform one processing step to a vertically positioned flexible conductive substrate 2030. In one embodiment, the processing chambers 2032-2054 are stand alone modular processing chambers wherein each modular processing chamber is structurally separated from the other modular processing chambers. Therefore, each of the stand alone modular processing chambers, can be arranged, rearranged, replaced, or maintained independently without affecting each other. In one embodiment, the vertical processing chamber is configured to perform a dual-sided deposition process, e.g., simultaneously process opposite sides of the flexible conductive substrate. Exemplary embodiments of the processing chambers are disclosed in U.S. patent application Ser. No. 11/566,202, titled HIGH-ASPECT RATIO ANODE AND APPARATUS FOR HIGH-SPEED ELECTROPLATING ON A SOLAR CELL SUBSTRATE, to Lopatin at al., filed Dec. 1, 2006, which is hereby incorporated by reference in its entirety.

In one embodiment, the processing system 2020 comprises a first plating chamber 2032 configured to perform a first plating process, for a example, a copper plating process, on at least a portion of the flexible conductive substrate 2030. In one embodiment, the first plating chamber 2032 is adapted to plate a copper conductive microstructure over the vertically oriented conductive flexible substrate 2030. In one embodiment, the copper conductive microstructure comprises a columnar metal layer with a porous conductive dendritic structure deposited thereon.

In one embodiment, the processing system 2020 further comprises a first rinse chamber 2034 configured to rinse and remove any residual plating solution from the portion of the vertically oriented conductive flexible substrate 2030 with a rinsing fluid, for example, de-ionized water, after the first plating process.

In one embodiment, the processing system 2020 further comprises a second plating chamber 2036 disposed next to the first rinse chamber 2034. In one embodiment, the second plating chamber 2036 is configured to perform a second plating process. In one embodiment, the second plating chamber 2036 is adapted to deposit a second conductive material, for example, tin particles or tin nano-wires, over the vertically oriented conductive flexible substrate 2030.

In one embodiment, the processing system 2020 further comprises a second rinse chamber 2038 configured to rinse and remove any residual plating solution from the portion of the vertically oriented conductive flexible substrate 2030 with a rinsing fluid, for example, de-ionized water, after the second plating process. In one embodiment, a chamber 2040 comprising an air-knife is positioned adjacent to the second rinse chamber 2038.

In one embodiment, the processing system 2020 further comprises a first drying chamber 2042 configured to expose the vertically oriented conductive substrate 2030 to a drying process. In one embodiment, the first drying chamber 2042 is configured to perform a drying process such as an air drying process, an infrared drying process, or a marangoni drying process.

The processing system 2020 may further comprise a spray coating chamber 2044 configured to deposit a powder over and/or into the conductive microstructure on the vertically oriented conductive substrate 2030. Although discussed as a spray coating chamber, the first spray coating chamber 2044 may be configured to perform any of the aforementioned deposition processes. In one embodiment, the first spray coating chamber 2044 is configured to deposit silicon over the vertically oriented conductive flexible substrate 2030. The first spray coating chamber 2044 may be replaced by a chemical vapor deposition (CVD) chamber configured to deposit silicon containing material.

In one embodiment, the processing system 2020 further comprises an annealing chamber 2046 disposed adjacent to the first spray coating chamber 2044 configured to expose the vertically oriented conductive substrate 2030 to an annealing process. In one embodiment, the annealing chamber 2046 is configured to perform a drying process such as a rapid thermal annealing process.

In one embodiment, the processing system 2020 further comprises a second spray coating chamber 2048 positioned adjacent to the annealing chamber 2046. Although discussed as a spray coating chamber, the second spray coating chamber 2048 may be configured to perform any of the aforementioned deposition processes. In one embodiment, the second spray coating chamber 2048 is configured to deposit an active material and/or additive material such as a binder over the vertically oriented conductive substrate 2030. The first spray coating chamber 2044 and the second spray coating chamber 2048 may be configured to deposit material over the vertically oriented conductive substrate 2030 using, for example, an electrostatic spraying process or a slit coating process.

In one embodiment, the processing system 2020 further comprises a compression chamber 2050 disposed adjacent to the second spray coating chamber 2048 configured to expose the vertically oriented conductive substrate 2030 to a calendaring process to compress the deposited powder into the conductive microstructure. The compression chamber 2050 may be used to vary the porosity of the as-deposited silicon material.

In one embodiment, the processing system 2020 further comprises a third drying chamber 2052 disposed adjacent to the compression chamber 2050 configured to expose the vertically oriented conductive substrate 2030 to a drying process. In one embodiment, the third drying chamber 2052 is configured to perform a drying process such as an air drying process, an infrared drying process, or a marangoni drying process.

In one embodiment, the processing system 2020 further comprises a third spray coating chamber 2054 positioned adjacent to the drying chamber 2052. Although discussed as a spray coating chamber, the third spray coating chamber 2054 may be configured to perform any of the aforementioned powder deposition processes. In one embodiment, the third spray coating chamber 2054 is configured to deposit a separator layer over the vertically oriented conductive substrate.

In certain embodiments, the processing system 2020 further comprises additional processing chambers. The additional modular processing chambers may comprise one or more processing chambers selected from the group of processing chambers comprising an electrochemical plating chamber, an electroless deposition chamber, a chemical vapor deposition chamber, a plasma enhanced chemical vapor deposition chamber, an atomic layer deposition chamber, a rinse chamber, an anneal chamber, a drying chamber, a spray coating chamber, and combinations thereof. It should also be understood that additional chambers or fewer chambers may be included in the in-line processing system.

The processing chambers 2032-2054 are generally arranged along a line so that portions of the vertically oriented conductive substrate 2030 can be streamlined through each chamber through feed roll 2060 and take up roll 2062.

In embodiments where a cathode structure is formed, chamber 2032 may be replaced with a chamber configured to perform aluminum oxide removal and chamber 2036 may be replaced with an aluminum electro-etch chamber.

EXAMPLES

The following hypothetical non-limiting examples are provided to further illustrate embodiments described herein. However, the examples are not intended to be all inclusive and are not intended to limit the scope of the embodiments described herein.

Example 1

Tin particles were plated directly on copper foil as follows: a copper foil substrate was immersed in a plating solution in a roll-to-roll electroplating chamber. The tin plating solution initially comprised 43 g/L of $SnSO_4$, 80 ml/L of $H_2SO_4$, 250 g/L of sodium citrate, and the remainder DI water to 1 L. The tin particles were deposited at voltage of between about 1.2 and 2.0 volts and a current density of between 0.1-0.2 $A/cm^2$. The process was performed at room temperature. Tin micro-particles of between 1-4 microns were deposited on the copper foil.

Example 2

Tin particles were plated on a copper dendrite structure as follows: a copper foil substrate was immersed in a first plating solution in a first electroplating chamber in a roll-to-roll processing system. The first plating solution comprised 125 g/L of $CuSO_4$, 80 ml/L of $H_2SO_4$, and the remainder DI water to 1 L. A three dimensional porous copper anode structure comprising a columnar copper microstructure and copper dendrites was deposited on the copper foil substrate. The copper foil substrate was immersed in a second plating solution in a second plating solution. The second plating solution comprised 43 g/L of $SnSO_4$, 80 ml/L of $H_2SO_4$, 250 g/L of sodium citrate, and the remainder DI water to 1 L. The tin particles were deposited at voltage of between about 1.2 and 2.0 volts and a current density of between 0.1-0.2 $A/cm^2$. The process was performed at room temperature. Tin nano-particles of between 20-100 nanometers were deposited on the copper foil.

Example 3

Tin particles were plated on a copper dendrite structure as follows: a copper foil substrate was immersed in a first plating solution in a first electroplating chamber in a roll-to-roll processing system. The first plating solution comprised 60 g/L of $CuSO_4$, 43 g/L of $SnSO_4$, 80 ml/L of $H_2SO_4$, and the remainder DI water to 1 L. A three dimensional porous copper anode structure comprising a columnar copper microstructure and copper-tin dendrites was deposited on the copper foil substrate. The copper foil substrate was immersed in a second plating solution in a second plating solution. The second plating solution comprised 43 g/L of $SnSO_4$, 80 ml/L of $H_2SO_4$, 250 g/L of sodium citrate, and the remainder DI water to 1 L. The tin particles were deposited at voltage of between about 1.2 and 2.0 volts and a current density of between 0.1-0.2 A/cm². The process was performed at room temperature. Tin micro-particles of between 1-4 microns were deposited on the copper foil.

Example 4

Tin particles were plated on a copper dendrite structure as follows: a copper foil substrate was immersed in a first plating solution in a first electroplating chamber in a roll-to-roll processing system. The first plating solution comprised 60 g/L of $CuSO_4$, 43 g/L of $SnSO_4$, 80 ml/L of $H_2SO_4$, and the remainder DI water to 1 L. A three dimensional porous copper anode structure comprising a columnar copper microstructure and copper-tin dendrites was deposited on the copper foil substrate. The copper foil substrate was immersed in a second plating solution in a second plating chamber. The second plating solution comprised 43 g/L of $SnSO_4$, 80 ml/L of $H_2SO_4$, 250 g/L of sodium citrate, and the remainder DI water to 1 L. The tin particles were deposited at voltage of between about 1.2 and 2.0 volts and a current density of between 0.1-0.2 A/cm². The process was performed at room temperature. Tin micro-particles of between 1-4 microns were deposited on the copper foil. A mesoporous carbon containing material was deposited over the dendritic structure to form a complex anodic structure. The structure was annealed at a temperature between about 100° C. and about 400° C. in a nitrogen atmosphere between atmospheric pressure and $10^{-4}$ Torr.

While the foregoing is directed to embodiments of the present invention, other and further embodiments of the invention may be devised without departing from the basic scope thereof, and the scope thereof is determined by the claims that follow.

The invention claimed is:

1. A method for forming an anode structure, comprising:
    depositing tin particles on a flexible conductive substrate;
    forming a plurality of conductive columnar microstructures over the tin particles and flexible conductive substrate;
    forming a dendritic structure over the conductive columnar microstructures; and
    depositing tin particles over the dendritic structure.

2. The method of claim 1, wherein the tin particles are nano-particles having a particle size between about 10 nm and about 50 nm.

3. The method of claim 1, wherein the tin particles are micro-particles having a particle size of about 1 micron.

4. The method of claim 1, further comprising:
    depositing a composite material selected from the group comprising carbon, silicon, graphite, $LiTiO_2$, and combinations thereof over the dendritic structure; and
    forming a separator layer over the composite material.

5. The method of claim 1, wherein the conductive columnar microstructure is a copper microstructure and the dendritic structure is a copper-tin dendritic structure.

* * * * *

UNITED STATES PATENT AND TRADEMARK OFFICE
CERTIFICATE OF CORRECTION

PATENT NO.         : 8,546,020 B2                                           Page 1 of 1
APPLICATION NO.    : 12/909436
DATED              : October 1, 2013
INVENTOR(S)        : Lopatin et al.

It is certified that error appears in the above-identified patent and that said Letters Patent is hereby corrected as shown below:

In the Specification:

Column 9, Line 17, please delete "(pm)" and insert -- (μm) -- therefor;

Column 15, Line 28, please delete "at" and insert -- et -- therefor;

Column 22, Line 25, please delete "at" and insert -- et -- therefor.

Signed and Sealed this
Thirty-first Day of December, 2013

Margaret A. Focarino
*Commissioner for Patents of the United States Patent and Trademark Office*